(12) United States Patent
Nguyen et al.

(10) Patent No.: US 7,281,581 B2
(45) Date of Patent: *Oct. 16, 2007

(54) METHODS OF HYDRAULIC FRACTURING AND OF PROPPING FRACTURES IN SUBTERRANEAN FORMATIONS

(75) Inventors: Philip D. Nguyen, Duncan, OK (US); Jimmie D. Weaver, Duncan, OK (US); Ron A. Gibson, Duncan, OK (US); Johnny A. Barton, Marlow, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 246 days.

This patent is subject to a terminal disclaimer.

(21) Appl. No.: 11/000,806

(22) Filed: Dec. 1, 2004

(65) Prior Publication Data

US 2006/0113078 A1 Jun. 1, 2006

(51) Int. Cl.
*E21B 43/267* (2006.01)
(52) U.S. Cl. .................................................. 166/280.2
(58) Field of Classification Search .................. None
See application file for complete search history.

(56) References Cited

U.S. PATENT DOCUMENTS

| | | | |
|---|---|---|---|
| 2,238,671 A | 4/1941 | Woodhouse | 166/21 |
| 2,703,316 A | 3/1955 | Schneider | 260/78.3 |
| 2,869,642 A | 1/1959 | McKay et al. | |
| 3,047,067 A | 7/1962 | Williams et al. | 166/33 |
| 3,123,138 A | 3/1964 | Robichaux | 166/33 |
| 3,176,768 A | 4/1965 | Brandt et al. | 166/33 |
| 3,199,590 A | 8/1965 | Young | 166/33 |
| 3,272,650 A | 9/1966 | MacVittie | 134/7 |
| 3,297,086 A | 1/1967 | Spain | 166/33 |
| 3,308,885 A | 3/1967 | Sandiford | 166/33 |
| 3,316,965 A | 5/1967 | Watanabe | 166/33 |
| 3,375,872 A | 4/1968 | McLaughlin et al. | 166/29 |
| 3,404,735 A | 10/1968 | Young et al. | 166/33 |
| 3,415,320 A | 12/1968 | Young | 166/33 |
| 3,492,147 A | 1/1970 | Young et al. | 117/62.2 |
| 3,592,266 A | 7/1971 | Tinsley | |
| 3,659,651 A | 5/1972 | Graham | |

(Continued)

FOREIGN PATENT DOCUMENTS

CA 2063877 5/2003

(Continued)

OTHER PUBLICATIONS

S. W. Almond, et al., "*Factors Affecting Proppant Flowback with Resin Coated Proppants,*" Society of Petroleum Engineers, Inc., SPE 30096, p. 171-186, 1995.

(Continued)

*Primary Examiner*—Jennifer H. Gay
*Assistant Examiner*—Kerry W. Leonard
(74) *Attorney, Agent, or Firm*—Robert A. Kent; Fletcher, Yoder & Van Sameren

(57) ABSTRACT

A method of propping at least one fracture in a subterranean formation, that comprises forming a plurality of proppant aggregates, each proppant aggregate comprising a binding fluid and a filler material, and introducing the plurality of proppant aggregates into the at least one fracture, is provided. Methods of fracturing a subterranean formation also are provided.

65 Claims, 4 Drawing Sheets

U.S. PATENT DOCUMENTS

| | | | |
|---|---|---|---|
| 3,681,287 A | 8/1972 | Brown et al. | 260/67 |
| 3,754,598 A | 8/1973 | Holloway, Jr. | 166/249 |
| 3,765,804 A | 10/1973 | Brandon | 417/540 |
| 3,768,564 A | 10/1973 | Knox et al. | 166/307 |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,842,911 A | 10/1974 | Know et al. | 166/307 |
| 3,854,533 A | 12/1974 | Gurley et al. | 166/276 |
| 3,863,709 A | 2/1975 | Fitch | 165/1 |
| 3,868,998 A | 3/1975 | Lybarger et al. | 166/278 |
| 3,888,311 A | 6/1975 | Cooke, Jr. | |
| 3,912,692 A | 10/1975 | Casey et al. | 260/78.3 |
| 3,933,205 A | 1/1976 | Kiel | |
| 3,948,672 A | 4/1976 | Harnberger | 106/90 |
| 3,955,993 A | 5/1976 | Curtice | 106/90 |
| 3,960,736 A | 6/1976 | Free et al. | 252/8.55 R |
| 4,008,763 A | 2/1977 | Lowe et al. | 166/253 |
| 4,015,995 A | 4/1977 | Hess | 106/287 |
| 4,029,148 A | 6/1977 | Emery | 166/250.1 |
| 4,031,958 A | 6/1977 | Sandiford et al. | 166/270 |
| 4,042,032 A | 8/1977 | Anderson | 166/276 |
| 4,070,865 A | 1/1978 | McLaughlin | 61/36 |
| 4,074,760 A | 2/1978 | Copeland et al. | 166/276 |
| 4,085,801 A | 4/1978 | Sifferman et al. | 166/295 |
| 4,127,173 A | 11/1978 | Watkins et al. | 166/276 |
| 4,169,798 A | 10/1979 | DeMartino | 252/8.55 R |
| 4,172,066 A | 10/1979 | Zweigle et al. | 260/29.6 TA |
| 4,245,702 A | 1/1981 | Haafkens et al. | 166/307 |
| 4,273,187 A | 6/1981 | Satter et al. | 166/250 |
| 4,305,463 A | 12/1981 | Zakiewicz | 106/245 |
| 4,336,842 A | 6/1982 | Graham et al. | 166/276 |
| 4,352,674 A | 10/1982 | Fery | 23/230 |
| 4,353,806 A | 10/1982 | Canter et al. | 507/229 |
| 4,387,769 A | 6/1983 | Erbstoesser et al. | 166/295 |
| 4,415,805 A | 11/1983 | Fertl et al. | 250/260 |
| 4,439,489 A | 3/1984 | Johnson et al. | 428/404 |
| 4,443,347 A | 4/1984 | Underdown et al. | 252/8.55 R |
| 4,460,052 A | 7/1984 | Gockel | 175/72 |
| 4,470,915 A | 9/1984 | Conway | 252/8.55 R |
| 4,493,875 A | 1/1985 | Beck et al. | 428/403 |
| 4,494,605 A | 1/1985 | Wiechel et al. | 166/288 |
| 4,498,995 A | 2/1985 | Gockel | 252/8.5 LC |
| 4,501,328 A | 2/1985 | Nichols | 166/288 |
| 4,526,695 A | 7/1985 | Erbstosser et al. | 252/8.55 R |
| 4,527,627 A | 7/1985 | Graham et al. | 166/280 |
| 4,541,489 A | 9/1985 | Wu | 166/312 |
| 4,546,012 A | 10/1985 | Brooks | 427/213 |
| 4,553,596 A | 11/1985 | Graham et al. | 166/295 |
| 4,564,459 A | 1/1986 | Underdown et al. | 252/8.55 R |
| 4,572,803 A | 2/1986 | Yamazoe et al. | 534/16 |
| 4,649,998 A | 3/1987 | Friedman | 166/294 |
| 4,664,819 A | 5/1987 | Glaze et al. | 252/8.551 |
| 4,665,988 A | 5/1987 | Murphey et al. | 166/295 |
| 4,669,543 A | 6/1987 | Young | 166/276 |
| 4,675,140 A | 6/1987 | Sparks et al. | 264/4.3 |
| 4,683,954 A | 8/1987 | Walker et al. | 166/307 |
| 4,694,905 A | 9/1987 | Armbruster | 166/280 |
| 4,715,967 A | 12/1987 | Bellis | 252/8.551 |
| 4,716,964 A | 1/1988 | Erbstoesser et al. | 166/284 |
| 4,733,729 A | 3/1988 | Copeland | 166/276 |
| 4,739,832 A | 4/1988 | Jennings, Jr. et al. | 166/299 |
| 4,785,884 A | 11/1988 | Armbruster | 166/280 |
| 4,787,453 A | 11/1988 | Hewgill et al. | 166/272.3 |
| 4,789,105 A | 12/1988 | Hosokawa et al. | 241/67 |
| 4,796,701 A | 1/1989 | Hudson et al. | 166/278 |
| 4,797,262 A | 1/1989 | Dewitz | 422/142 |
| 4,800,960 A | 1/1989 | Friedman et al. | 166/276 |
| 4,809,783 A | 3/1989 | Hollenbeck et al. | 166/307 |
| 4,817,721 A | 4/1989 | Pober | 166/295 |
| 4,829,100 A | 5/1989 | Murphey et al. | 523/131 |
| 4,843,118 A | 6/1989 | Lai et al. | 524/555 |
| 4,848,467 A | 7/1989 | Cantu et al. | 166/281 |
| 4,848,470 A | 7/1989 | Korpics | 166/312 |
| 4,850,430 A | 7/1989 | Copeland et al. | 166/276 |
| 4,886,354 A | 12/1989 | Welch et al. | 356/70 |
| 4,888,240 A | 12/1989 | Graham et al. | 428/403 |
| 4,895,207 A | 1/1990 | Friedman et al. | 166/276 |
| 4,903,770 A | 2/1990 | Friedman et al. | 166/288 |
| 4,934,456 A | 6/1990 | Moradi-Araghi | 166/270 |
| 4,942,186 A | 7/1990 | Murphey et al. | 523/131 |
| 4,957,165 A | 9/1990 | Cantu et al. | 166/295 |
| 4,959,432 A | 9/1990 | Fan et al. | 526/287 |
| 4,961,466 A | 10/1990 | Himes et al. | 166/250 |
| 4,969,522 A | 11/1990 | Whitehurst et al. | 166/278 |
| 4,969,523 A | 11/1990 | Martin et al. | 166/278 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,030,603 A | 7/1991 | Rumpf et al. | 501/127 |
| 5,049,743 A | 9/1991 | Taylor, III et al. | 250/303 |
| 5,082,056 A | 1/1992 | Tackett, Jr. | 166/295 |
| 5,107,928 A | 4/1992 | Hilterhaus | 166/293 |
| 5,128,390 A | 7/1992 | Murphey et al. | 523/130 |
| 5,135,051 A | 8/1992 | Facteau et al. | 166/104 |
| 5,142,023 A | 8/1992 | Gruber et al. | 528/354 |
| 5,165,438 A | 11/1992 | Facteau et al. | 137/1 |
| 5,173,527 A | 12/1992 | Calve | 524/74 |
| 5,178,218 A | 1/1993 | Dees | 166/281 |
| 5,182,051 A | 1/1993 | Bandy et al. | 252/645 |
| 5,199,491 A | 4/1993 | Kutts et al. | 166/276 |
| 5,199,492 A | 4/1993 | Surles et al. | 166/295 |
| 5,211,234 A | 5/1993 | Floyd | 166/276 |
| 5,216,050 A | 6/1993 | Sinclair | 524/108 |
| 5,218,038 A | 6/1993 | Johnson et al. | 524/541 |
| 5,232,955 A | 8/1993 | Caabai et al. | 521/63 |
| 5,232,961 A | 8/1993 | Murphey et al. | 523/414 |
| 5,238,068 A | 8/1993 | Fredickson | 166/307 |
| 5,247,059 A | 9/1993 | Gruber et al. | 528/354 |
| 5,249,628 A | 10/1993 | Surjaatmadja | 166/305 |
| 5,256,729 A | 10/1993 | Kutts et al. | 524/700 |
| 5,273,115 A | 12/1993 | Spafford | 166/281 |
| 5,285,849 A | 2/1994 | Surles et al. | 166/295 |
| 5,293,939 A | 3/1994 | Surles et al. | 166/295 |
| 5,295,542 A | 3/1994 | Cole et al. | 166/278 |
| 5,320,171 A | 6/1994 | Laramay | 166/285 |
| 5,321,062 A | 6/1994 | Landrum et al. | 523/141 |
| 5,325,923 A | 7/1994 | Surjaatmadja et al. | 166/308 |
| 5,330,005 A | 7/1994 | Card et al. | 166/280 |
| 5,332,037 A | 7/1994 | Schmidt et al. | 166/276 |
| 5,335,726 A | 8/1994 | Rodrogues | 166/295 |
| 5,351,754 A | 10/1994 | Hardin et al. | 166/249 |
| 5,358,051 A | 10/1994 | Rodrigues | 166/295 |
| 5,359,026 A | 10/1994 | Gruber | 528/354 |
| 5,360,068 A | 11/1994 | Sprunt et al. | 166/259 |
| 5,361,856 A | 11/1994 | Surjaatmadja et al. | 175/67 |
| 5,363,916 A | 11/1994 | Himes et al. | 166/276 |
| 5,373,901 A | 12/1994 | Norman et al. | 166/300 |
| 5,377,759 A | 1/1995 | Surles | 166/295 |
| 5,381,864 A | 1/1995 | Nguyen et al. | 166/280 |
| 5,386,874 A | 2/1995 | Laramay et al. | 166/300 |
| 5,388,648 A | 2/1995 | Jordan, Jr. | 166/380 |
| 5,393,810 A | 2/1995 | Harris et al. | 524/56 |
| 5,396,957 A | 3/1995 | Surjaatmadja et al. | 166/308 |
| 5,402,846 A | 4/1995 | Jennings, Jr. et al. | 166/259 |
| 5,403,822 A | 4/1995 | Mueller et al. | |
| 5,422,183 A | 6/1995 | Sinclair et al. | 428/403 |
| 5,423,381 A | 6/1995 | Surles et al. | 166/295 |
| 5,439,055 A | 8/1995 | Card et al. | 166/280 |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/54 |
| 5,492,178 A | 2/1996 | Nguyen et al. | 166/276 |

| Patent No. | Date | Inventor | Class |
|---|---|---|---|
| 5,494,103 A | 2/1996 | Surjaatmadja et al. | 166/222 |
| 5,497,830 A | 3/1996 | Boles et al. | 166/300 |
| 5,498,280 A | 3/1996 | Fistner et al. | 106/19 |
| 5,499,678 A | 3/1996 | Surjaatmadja et al. | 166/298 |
| 5,501,275 A | 3/1996 | Card et al. | 166/280 |
| 5,505,787 A | 4/1996 | Yamaguchi | 134/4 |
| 5,512,071 A | 4/1996 | Yam et al. | 51/307 |
| 5,520,250 A | 5/1996 | Harry et al. | 166/278 |
| 5,522,460 A | 6/1996 | Shu | 166/295 |
| 5,529,123 A | 6/1996 | Carpenter et al. | 166/293 |
| 5,531,274 A | 7/1996 | Bienvenu, Jr. | 166/280 |
| 5,536,807 A | 7/1996 | Gruber et al. | 528/354 |
| 5,545,824 A | 8/1996 | Stengel et al. | 524/590 |
| 5,551,513 A | 9/1996 | Surles et al. | 166/278 |
| 5,551,514 A | 9/1996 | Nelson et al. | 166/280 |
| 5,582,249 A | 12/1996 | Caveny et al. | 166/276 |
| 5,582,250 A | 12/1996 | Constein | 166/280 |
| 5,588,488 A | 12/1996 | Vijn et al. | 166/293 |
| 5,591,700 A | 1/1997 | Harris et al. | 507/204 |
| 5,594,095 A | 1/1997 | Gruber et al. | 528/354 |
| 5,595,245 A | 1/1997 | Scott, III | 166/250.1 |
| 5,597,784 A | 1/1997 | Sinclair et al. | 507/212 |
| 5,604,184 A | 2/1997 | Ellis et al. | 507/117 |
| 5,604,186 A | 2/1997 | Hunt et al. | 507/204 |
| 5,609,207 A | 3/1997 | Dewprashad et al. | 166/276 |
| 5,620,049 A | 4/1997 | Gipson et al. | 166/248 |
| 5,639,806 A | 6/1997 | Johnson et al. | 523/208 |
| 5,670,473 A | 9/1997 | Scepanski | 510/445 |
| 5,692,566 A | 12/1997 | Surles | 166/295 |
| 5,697,440 A | 12/1997 | Weaver et al. | 166/281 |
| 5,698,322 A | 12/1997 | Tsai et al. | 428/373 |
| 5,732,364 A | 3/1998 | Kalb et al. | 588/8 |
| 5,765,642 A | 6/1998 | Surjaatmadja | |
| 5,775,425 A | 7/1998 | Weaver et al. | 166/276 |
| 5,782,300 A | 7/1998 | James et al. | 166/278 |
| 5,783,822 A | 7/1998 | Buchanan et al. | 250/259 |
| 5,787,986 A | 8/1998 | Weaver et al. | 166/276 |
| 5,791,415 A | 8/1998 | Nguyen et al. | 166/280 |
| 5,799,734 A | 9/1998 | Norman et al. | 166/278 |
| 5,806,593 A | 9/1998 | Surles | 166/270 |
| 5,830,987 A | 11/1998 | Smith | 528/332 |
| 5,833,000 A | 11/1998 | Weaver et al. | |
| 5,833,361 A | 11/1998 | Funk | 366/80 |
| 5,836,391 A | 11/1998 | Jonasson et al. | 166/295 |
| 5,836,392 A | 11/1998 | Urlwin-Smith | 166/295 |
| 5,837,656 A | 11/1998 | Sinclair et al. | 507/220 |
| 5,837,785 A | 11/1998 | Kinsho et al. | 525/527 |
| 5,839,510 A | 11/1998 | Weaver et al. | 166/276 |
| 5,840,784 A | 11/1998 | Funkhouser et al. | 523/130 |
| 5,849,401 A | 12/1998 | El-Afandi et al. | 428/215 |
| 5,849,590 A | 12/1998 | Anderson, II et al. | 436/27 |
| 5,853,048 A | 12/1998 | Weaver et al. | |
| 5,864,003 A | 1/1999 | Qureshi et al. | 528/141 |
| 5,865,936 A | 2/1999 | Edelman et al. | 156/310 |
| 5,871,049 A | 2/1999 | Weaver et al. | 166/276 |
| 5,873,413 A | 2/1999 | Chatterji et al. | 166/293 |
| 5,875,844 A | 3/1999 | Chatterji et al. | 166/293 |
| 5,875,845 A | 3/1999 | Chatterji et al. | 166/280 |
| 5,875,846 A | 3/1999 | Chatterji et al. | 166/293 |
| 5,893,383 A | 4/1999 | Fracteau | 137/14 |
| 5,893,416 A | 4/1999 | Read | 166/304 |
| 5,908,073 A | 6/1999 | Nguyen et al. | 166/276 |
| 5,911,282 A | 6/1999 | Onan et al. | 175/72 |
| 5,916,933 A | 6/1999 | Johnson et al. | 523/208 |
| 5,921,317 A | 7/1999 | Dewprashad et al. | 166/208 |
| 5,924,488 A | 7/1999 | Nguyen et al. | 166/280 |
| 5,929,437 A | 7/1999 | Elliott et al. | 250/259 |
| 5,944,105 A | 8/1999 | Nguyen | 166/278 |
| 5,945,387 A | 8/1999 | Chatterji et al. | 507/224 |
| 5,948,734 A | 9/1999 | Sinclair et al. | 507/219 |
| 5,957,204 A | 9/1999 | Chatterji et al. | 166/295 |
| 5,960,877 A | 10/1999 | Funkhouser et al. | 166/270 |
| 5,960,880 A | 10/1999 | Nguyen et al. | 166/280 |
| 5,964,291 A | 10/1999 | Bourne et al. | 166/279 |
| 5,969,006 A | 10/1999 | Onan et al. | 523/166 |
| 5,977,283 A | 11/1999 | Rossitto | 528/44 |
| 5,994,785 A | 11/1999 | Higuchi et al. | 527/789 |
| RE36,466 E | 12/1999 | Nelson et al. | 166/280 |
| 6,003,600 A | 12/1999 | Nguyen et al. | 166/281 |
| 6,004,400 A | 12/1999 | Bishop et al. | 134/2 |
| 6,006,835 A | 12/1999 | Onan et al. | 166/295 |
| 6,006,836 A | 12/1999 | Chatterji et al. | 166/295 |
| 6,012,524 A | 1/2000 | Chatterji et al. | 166/295 |
| 6,016,870 A | 1/2000 | Dewprashad et al. | 166/295 |
| 6,024,170 A | 2/2000 | McCabe et al. | |
| 6,028,113 A | 2/2000 | Scepanski | 514/643 |
| 6,028,534 A | 2/2000 | Ciglenec et al. | 340/856.2 |
| 6,040,398 A | 3/2000 | Kinsho et al. | 525/527 |
| 6,047,772 A | 4/2000 | Weaver et al. | 166/276 |
| 6,059,034 A | 5/2000 | Rickards et al. | 166/280 |
| 6,059,035 A | 5/2000 | Chatterji et al. | 166/293 |
| 6,059,036 A | 5/2000 | Chatterji et al. | 166/294 |
| 6,068,055 A | 5/2000 | Chatterji et al. | 166/293 |
| 6,069,117 A | 5/2000 | Onan et al. | 507/202 |
| 6,074,739 A | 6/2000 | Katagiri | 428/323 |
| 6,079,492 A | 6/2000 | Hoogteijling et al. | 166/276 |
| 6,098,711 A | 8/2000 | Chatterji et al. | 166/294 |
| 6,114,410 A | 9/2000 | Betzold | 523/130 |
| 6,123,871 A | 9/2000 | Carroll | 252/301.36 |
| 6,123,965 A | 9/2000 | Jacon et al. | 424/489 |
| 6,124,246 A | 9/2000 | Heathman et al. | 507/219 |
| 6,130,286 A | 10/2000 | Thomas et al. | 524/507 |
| 6,135,987 A | 10/2000 | Tsai et al. | 604/365 |
| 6,140,446 A | 10/2000 | Fujiki et al. | 528/15 |
| 6,148,911 A | 11/2000 | Gipson et al. | 166/248 |
| 6,162,766 A | 12/2000 | Muir et al. | 507/267 |
| 6,169,058 B1 | 1/2001 | Le et al. | 507/222 |
| 6,172,011 B1 | 1/2001 | Card et al. | 507/204 |
| 6,172,077 B1 | 1/2001 | Curtis et al. | 514/278 |
| 6,176,315 B1 | 1/2001 | Reddy et al. | 166/295 |
| 6,177,484 B1 | 1/2001 | Surles | 523/131 |
| 6,184,311 B1 | 2/2001 | O'Keefe et al. | 525/438 |
| 6,187,834 B1 | 2/2001 | Thayer et al. | 522/15 |
| 6,187,839 B1 | 2/2001 | Eoff et al. | 523/130 |
| 6,189,615 B1 | 2/2001 | Sydansk | 166/270 |
| 6,192,985 B1 | 2/2001 | Hinkel et al. | 166/280 |
| 6,192,986 B1 | 2/2001 | Urlwin-Smith | 166/295 |
| 6,196,317 B1 | 3/2001 | Hardy | 166/295 |
| 6,202,751 B1 | 3/2001 | Chatterji et al. | 166/276 |
| 6,209,643 B1 | 4/2001 | Nguyen et al. | |
| 6,209,644 B1 | 4/2001 | Brunet | 166/297 |
| 6,209,646 B1 | 4/2001 | Reddy et al. | 166/300 |
| 6,210,471 B1 | 4/2001 | Craig | 106/31.08 |
| 6,214,773 B1 | 4/2001 | Harris et al. | 507/211 |
| 6,231,664 B1 | 5/2001 | Chatterji et al. | 106/724 |
| 6,234,251 B1 | 5/2001 | Chatterji et al. | 166/295 |
| 6,238,597 B1 | 5/2001 | Yim et al. | 252/512 |
| 6,241,019 B1 | 6/2001 | Davidson et al. | 166/249 |
| 6,242,390 B1 | 6/2001 | Mitchell et al. | 507/211 |
| 6,244,344 B1 | 6/2001 | Chatterji et al. | 166/295 |
| 6,257,335 B1 | 7/2001 | Nguyen et al. | 166/280 |
| 6,260,622 B1 | 7/2001 | Blok et al. | 166/305.1 |
| 6,271,181 B1 | 8/2001 | Chatterji et al. | 507/219 |
| 6,274,650 B1 | 8/2001 | Cui | 523/457 |
| 6,279,652 B1 | 8/2001 | Chatterji et al. | 166/194 |
| 6,279,656 B1 | 8/2001 | Sinclair et al. | 166/310 |
| 6,283,214 B1 | 9/2001 | Guinot et al. | 166/297 |
| 6,302,207 B1 | 10/2001 | Nguyen et al. | 166/276 |
| 6,306,998 B1 | 10/2001 | Kimura et al. | 528/12 |
| 6,311,773 B1 | 11/2001 | Todd et al. | 166/280 |
| 6,321,841 B1 | 11/2001 | Eoff et al. | 166/291 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,328,106 B1 | 12/2001 | Griffith et al. | 166/295 |
| 6,330,916 B1 | 12/2001 | Rickards et al. | 166/280 |

| | | | | | | |
|---|---|---|---|---|---|---|
| 6,330,917 B2 | 12/2001 | Chatterji et al. .............. 166/295 | 2001/0016562 A1 | 8/2001 | Muir et al. ................... 507/201 |
| 6,350,309 B2 | 2/2002 | Chatterji et al. .............. 106/677 | 2002/0043370 A1 | 4/2002 | Poe ......................... 166/250.07 |
| 6,357,527 B1 | 3/2002 | Norman et al. ................ 166/300 | 2002/0048676 A1 | 4/2002 | McDaniel et al. ............ 428/404 |
| 6,364,018 B1 | 4/2002 | Brannon et al. ............ 166/280.2 | 2003/0006036 A1 | 1/2003 | Malone et al. ........... 166/250.12 |
| 6,364,945 B1 | 4/2002 | Chatterji et al. .............. 106/677 | 2003/0060374 A1 | 3/2003 | Cooke, Jr. ................... 507/200 |
| 6,367,165 B1 | 4/2002 | Huttlin ........................... 34/582 | 2003/0114314 A1 | 6/2003 | Ballard et al. ............... 507/100 |
| 6,367,549 B1 | 4/2002 | Chatterji et al. .............. 166/292 | 2003/0130133 A1 | 7/2003 | Vollmer ....................... 507/100 |
| 6,372,678 B1 | 4/2002 | Youngsman et al. ........... 504/128 | 2003/0131999 A1 | 7/2003 | Nguyen et al. ............... 166/280 |
| 6,376,571 B1 | 4/2002 | Chawla et al. .................. 522/64 | 2003/0148893 A1 | 8/2003 | Lungofer et al. ............. 507/200 |
| 6,387,986 B1 | 5/2002 | Moradi-Araghi et al. ..... 523/211 | 2003/0186820 A1 | 10/2003 | Thesing ........................ 507/200 |
| 6,390,195 B1 | 5/2002 | Nguyen et al. ................. 166/276 | 2003/0188766 A1 | 10/2003 | Banerjee et al. ................ 134/7 |
| 6,401,817 B1 | 6/2002 | Griffith et al. ................. 166/295 | 2003/0188872 A1 | 10/2003 | Nguyen et al. ............... 166/308 |
| 6,405,797 B2 | 6/2002 | Davidson et al. ............. 166/249 | 2003/0196805 A1 | 10/2003 | Boney et al. ................. 166/280 |
| 6,406,789 B1 | 6/2002 | McDaniel et al. ............ 428/403 | 2003/0205376 A1 | 11/2003 | Ayoub et al. .............. 166/254.2 |
| 6,408,943 B1 | 6/2002 | Schultz et al. ................. 166/285 | 2003/0230408 A1 | 12/2003 | Acock et al. ................. 166/297 |
| 6,422,314 B1 | 7/2002 | Todd et al. .................... 166/312 | 2003/0234103 A1 | 12/2003 | Lee et al. ..................... 166/293 |
| 6,439,309 B1 | 8/2002 | Matherly et al. .............. 166/276 | 2004/0000402 A1 | 1/2004 | Nguyen et al. ............... 166/280 |
| 6,439,310 B1 | 8/2002 | Scott, III et al. .............. 166/308 | 2004/0014607 A1 | 1/2004 | Sinclair et al. ............... 507/200 |
| 6,440,255 B1 | 8/2002 | Kohlhammer et al. ....... 156/283 | 2004/0014608 A1 | 1/2004 | Nguyen et al. ............... 507/200 |
| 6,446,727 B1 | 9/2002 | Zemlak et al. ................ 166/308 | 2004/0040706 A1 | 3/2004 | Hossaini et al. .............. 166/278 |
| 6,448,206 B1 | 9/2002 | Griffith et al. ................. 507/219 | 2004/0040708 A1 | 3/2004 | Stephenson et al. ...... 166/280.1 |
| 6,450,260 B1 | 9/2002 | James et al. ................... 166/277 | 2004/0040713 A1 | 3/2004 | Nguyen et al. ............... 166/295 |
| 6,454,003 B1 | 9/2002 | Chang et al. .................. 166/270 | 2004/0048752 A1 | 3/2004 | Nguyen et al. ............... 507/269 |
| 6,458,885 B1 | 10/2002 | Stengal et al. ................ 524/507 | 2004/0055747 A1 | 3/2004 | Lee .............................. 166/278 |
| 6,485,947 B1 | 11/2002 | Rajgarhia et al. ............. 435/139 | 2004/0106525 A1 | 6/2004 | Willbert et al. ............... 507/200 |
| 6,488,091 B1 | 12/2002 | Weaver et al. | 2004/0138068 A1 | 7/2004 | Rimmer et al. ............... 507/100 |
| 6,488,763 B2 | 12/2002 | Brothers et al. .............. 106/692 | 2004/0149441 A1 | 8/2004 | Nguyen et al. ........... 166/280.1 |
| 6,494,263 B2 | 12/2002 | Todd .............................. 166/312 | 2004/0152601 A1 | 8/2004 | Still et al. ..................... 507/100 |
| 6,503,870 B2 | 1/2003 | Griffith et al. ................. 507/219 | 2004/0177961 A1 | 9/2004 | Nguyen et al. ............ 166/280.2 |
| 6,508,305 B1 | 1/2003 | Brannon et al. ............... 166/293 | 2004/0194961 A1 | 10/2004 | Nguyen et al. ............... 166/295 |
| 6,527,051 B1 | 3/2003 | Reddy et al. .................. 166/300 | 2004/0206499 A1 | 10/2004 | Nguyen et al. ............ 166/280.2 |
| 6,528,157 B1 | 3/2003 | Hussain et al. ................ 428/325 | 2004/0211559 A1 | 10/2004 | Nguyen et al. ............... 166/276 |
| 6,531,427 B1 | 3/2003 | Shuchart et al. ............... 507/267 | 2004/0211561 A1 | 10/2004 | Nguyen et al. ............ 166/280.2 |
| 6,538,576 B1 | 3/2003 | Schultz et al. .............. 340/859.6 | 2004/0221992 A1 | 11/2004 | Nguyen et al. ............... 166/295 |
| 6,552,333 B1 | 4/2003 | Storm et al. ................. 250/269.3 | 2004/0231845 A1 | 11/2004 | Cooke, Jr. ..................... 166/279 |
| 6,554,071 B1 | 4/2003 | Reddy et al. .................. 166/293 | 2004/0231847 A1 | 11/2004 | Nguyen et al. ............... 166/295 |
| 6,555,507 B2 | 4/2003 | Chatterji et al. ............... 507/219 | 2004/0256099 A1 | 12/2004 | Nguyen et al. ............... 166/249 |
| 6,569,814 B1 | 5/2003 | Brady et al. ................... 507/201 | 2004/0261995 A1 | 12/2004 | Nguyen et al. ............... 166/279 |
| 6,582,819 B2 | 6/2003 | McDaniel et al. ............ 428/402 | 2004/0261997 A1 | 12/2004 | Nguyen et al. ............... 166/281 |
| 6,593,402 B2 | 7/2003 | Chatterji et al. .................. 524/7 | 2005/0000731 A1 | 1/2005 | Nguyen et al. ................. 175/57 |
| 6,599,863 B1 | 7/2003 | Palmer et al. .................. 507/219 | 2005/0006093 A1 | 1/2005 | Nguyen et al. ............... 166/281 |
| 6,608,162 B1 | 8/2003 | Chiu et al. ..................... 528/129 | 2005/0006095 A1 | 1/2005 | Justus et al. .................. 166/295 |
| 6,616,320 B2 | 9/2003 | Huber et al. ................ 366/156.2 | 2005/0006096 A1 | 1/2005 | Nguyen et al. ............... 166/295 |
| 6,620,857 B2 | 9/2003 | Valet .............................. 522/42 | 2005/0028979 A1 * | 2/2005 | Brannon et al. ........... 166/280.2 |
| 6,626,241 B2 | 9/2003 | Nguyen ......................... 166/278 | 2005/0034862 A1 | 2/2005 | Nguyen et al. ............... 166/281 |
| 6,632,527 B1 | 10/2003 | McDaniel et al. ............ 428/402 | 2006/0048943 A1 * | 3/2006 | Parker et al. .............. 166/308.1 |
| 6,632,892 B2 | 10/2003 | Rubinsztajn et al. ......... 525/476 | | | |
| 6,642,309 B2 | 11/2003 | Komitsu et al. ............... 525/100 | FOREIGN PATENT DOCUMENTS | | |
| 6,648,501 B2 | 11/2003 | Huber et al. ................... 366/301 | EP | 0313243 B1 | 10/1988 |
| 6,659,179 B2 | 12/2003 | Nguyen ......................... 166/227 | EP | 0528595 A1 | 8/1992 |
| 6,664,343 B2 | 12/2003 | Narisawa et al. ............. 525/474 | EP | 0510762 A2 | 11/1992 |
| 6,667,279 B1 | 12/2003 | Hessert et al. ................. 507/225 | EP | 0643196 A2 | 6/1994 |
| 6,668,926 B2 | 12/2003 | Nguyen ......................... 166/280 | EP | 0834644 A2 | 4/1998 |
| 6,669,771 B2 | 12/2003 | Tokiwa et al. ............... 106/162.7 | EP | 0853186 A2 | 7/1998 |
| 6,681,856 B1 | 1/2004 | Chatterji et al. ............... 166/294 | EP | 0864726 A2 | 9/1998 |
| 6,686,328 B1 | 2/2004 | Binder ........................... 510/446 | EP | 0879935 B1 | 11/1998 |
| 6,705,400 B1 | 3/2004 | Nugyen et al. ................ 166/281 | EP | 0933498 A1 | 8/1999 |
| 6,710,019 B1 | 3/2004 | Sawdon et al. ................ 507/136 | EP | 1001133 A1 | 5/2000 |
| 6,713,170 B1 | 3/2004 | Kaneka et al. ................ 428/323 | EP | 1132569 A2 | 9/2001 |
| 6,725,926 B2 | 4/2004 | Nguyen et al. ............ 166/254.1 | EP | 1326003 A1 | 7/2003 |
| 6,725,931 B2 | 4/2004 | Nguyen et al. ............ 166/280.2 | EP | 1362978 A1 | 11/2003 |
| 6,729,404 B2 | 5/2004 | Nguyen et al. ............ 166/280.2 | EP | 1394355 A1 | 3/2004 |
| 6,732,800 B2 | 5/2004 | Acock et al. .................. 166/308 | EP | 1396606 A2 | 3/2004 |
| 6,745,159 B1 | 6/2004 | Todd et al. ..................... 703/10 | EP | 1398640 A1 | 3/2004 |
| 6,749,025 B1 | 6/2004 | Brannon et al. ............ 166/305.1 | EP | 1403466 A2 | 3/2004 |
| 6,763,888 B1 | 7/2004 | Harris et al. ................ 166/305.1 | EP | 1464789 A1 | 10/2004 |
| 6,766,858 B2 | 7/2004 | Nguyen et al. ................ 166/300 | GB | 1107584 | 3/1968 |
| 6,776,236 B1 | 8/2004 | Nguyen ......................... 166/279 | GB | 1264180 | 12/1969 |
| 6,832,650 B2 | 12/2004 | Nguyen et al. ................ 166/279 | GB | 1292718 | 10/1972 |
| 6,851,474 B2 | 2/2005 | Nguyen ......................... 166/279 | GB | 2382143 A | 4/2001 |
| 6,887,834 B2 | 5/2005 | Nguyen et al. ................ 507/221 | WO | WO 93/15127 | 8/1993 |
| 6,978,836 B2 | 12/2005 | Nguyen et al. ................ 166/295 | WO | WO 94/07949 | 4/1994 |
| 7,063,150 B2 * | 6/2006 | Slabaugh et al. ............. 166/278 | | | |

| WO | WO 94/08078 | 4/1994 |
| --- | --- | --- |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 01/81914 | 11/2001 |
| WO | WO 01/87797 A1 | 11/2001 |
| WO | WO 02/12674 A1 | 2/2002 |
| WO | WO 03/027431 A1 | 4/2003 |
| WO | WO 2004/037946 A1 | 5/2004 |
| WO | WO 2004/038176 A1 | 5/2004 |
| WO | WO 05/021928 | 3/2005 |

OTHER PUBLICATIONS

"Pillar Frac Stimulation Technique"; Halliburton Services; Fracturing Services Technical Data Sheet F-3150.
Halliburton, *CoalStim<sup>SM</sup> Service, Helps Boost Cash Flow From CBM Assets*, Stimulation, HO3679 Oct. 2003, Halliburton Communications.
Halliburton, *Conductivity Endurance Technology For High Permeability Reservoirs, Helps Prevent Intrusion of Formation Material Into the Proppant Pack for Improved Long-term Production*, Stimulation, 2003, Halliburton Communications.
Halliburton, *Expedite® Service, A Step-Change Improvement Over Conventional Proppant Flowback Control Systems. Provides Up to Three Times the Conductivity of RCPs.*, Stimulation, HO3296 May 2004, Halliburton Communications.
Halliburton Technical Flier—Multi Stage Completion Methods, 2 pages.
Halliburton "*CobraFrac<sup>SM</sup> Service, Coiled Tubing Fracturing—Cost-Effective Method for Stimulating Untapped Reserves*", 2 pages, 2004.
Halliburton "*CobraJetFrac<sup>SM</sup> Service, Cost-Effective Technology That Can Help Reduce Cost per BOE Produced, Shorten Cycle time and Reduce Capex*".
Halliburton Cobra Frac Advertisement, 2001.
Halliburton "*SurgiFrac<sup>SM</sup> Service, a Quick and cost-Effective Method to Help Boost Production From Openhole Horizonal Completions*", 2002.
Halliburton, *SandWedge® NT Conductivity Enhancement System, Enhances Proppant Pack Conductivity and Helps Prevent Intrusion of Formation Material for Improved Long-Term Production*, Stimulation, HO2289 May 2004, Halliburton Communications.
Nguyen et al., *A Novel Approach For Enhancing Proppant Consolidation: Laboratory Testing And Field Applications*, SPE Paper No. 77748, 2002.
SPE 15547, *Field Application of Lignosulfonate Gels To Reduce Channeling*, South Swan Hills Miscible Unit, Alberta, Canada, by O.R. Wagner et al., 1986.
Owens et al., *Waterflood Pressure Pulsing for Fractured Reservoirs* SPE 1123, 1966.
Felsenthal et al., *Pressure Pulsing—An Improved Method of Waterflooding Fractured Reservoirs* SPE 1788, 1957.
Raza, "*Water and Gas Cyclic Pulsing Method for Improved Oil Recovery*", SPE 3005, 1971.
Peng et al., "*Pressure Pulsing Waterflooding in Dual Porosity Naturally Fractured Reservoirs*" SPE 17587, 1988.
Dusseault et al, "*Pressure Pulse Workovers in Heavy Oil*", SPE 79033, 2002.
Yang et al., "*Experimental Study on Fracture Initiation By Pressure Pulse*", SPE 63035, 2000.
Nguyen et al., *New Guidelines For Applying Curable Resin-Coated Proppants*, SPE Paper No. 39582, 1997.
Kazakov et al., "*Optimizing and Managing Coiled Tubing Frac Strings*" SPE 60747, 2000.
Advances in Polymer Science, vol. 157, "*Degradable Aliphatic Polyesters*" edited by A.-C. Alberston, 2001.
Gorman, *Plastic Electric: Lining up the Future of Conducting Polymers* Science News, Vol. 163, May 17, 2003.
Gidley et al., "*Recent Advances in Hydraulic Fracturing*," Chapter 6, pp. 109-130, 1989.
Simmons et al., "*Poly(phenyllactide): Synthesis, Characterization, and Hydrolytic Degradation, Biomacromolecules*", vol. 2, No. 2, pp. 658-663, 2001.
Yin et al., "*Preparation and Characterization of Substituted Polylactides*", Americal Chemical Society, vol. 32, No. 23, pp. 7711-7718, 1999.
Yin et al., "*Synthesis and Properties of Polymers Derived from Substituted Lactic Acids*", American Chemical Society, Ch. 12, pp. 147-159, 2001.
Cantu et al., "*Laboratory and Field Evaluation of a Combined Fluid-Loss Control Additive and Gel Breaker for Fracturing Fluids*," SPE 18211, 1990.
Love et al., "*Selectively Placing Many Fractures in Openhole Horizontal Wells Improves Production*", SPE 50422, 1998.
McDaniel et al. "*Evolving New Stimulation Process Proves Highly Effective In Level 1 Dual-Lateral Completion*" SPE 78697, 2002.
Albertsson et al., "*Aliphatic Polyesters: Synthesis, Properties and Applications*", Advances in Polymer Science, vol. 57 Degradable Aliphatic Polyesters, 2002.
Dechy-Cabaret et al., "*Controlled Ring-Operated Polymerization of Lactide and Glycolide*" American Chemical Society, Chemical Reviews, A-Z, AA-AD, 2004.
Funkhouser et al., "*Synthetic Polymer Fracturing Fluid For High-Temperature Applications* ", SPE 80236, 2003.
*Chelating Agents*, Encyclopedia of Chemical Technology, vol. 5 (764-795).
Vichaibun et al., "*A New Assay for the Enzymatic Degradation of Polylactic Acid, Short Report*", ScienceAsia, vol. 29, pp. 297-300, 2003.
CDX Gas, CDX Solution, 2003, CDX, LLC, Available @ www.cdxgas.com/solution.html, printed pp. 1-2.
CDX Gas, "*What is Coalbed Methane?*" CDX, LLC. Available @ www.cdxgas.com/what.html, printed page 1.
Halliburton brochure entitled "H2Zero™ Service Introducing The Next Generation of cost-Effective Conformance Control Solutions", 2002.
Halliburton brochure entitled INJECTROL® A Component:, 1999.
Halliburton brochure entitled "INJECTROL® G Sealant", 1999.
Halliburton brochure entitled "INJECTROL® IT Sealant", 1999.
Halliburton brochure entitled "INJECTROL® Service Treatment", 1999.
Halliburton brochure entitled "INJECTROL® U Sealant", 1999.
Halliburton brochure entitled "Sanfix® A Resin", 1999.
Halliburton brochure entitled "Pillar Frac Stimulation Technique" Fracturing Services Technical Data Sheet, 2 pages.
Foreign search report and opinion (CPW 21582 EP), Mar. 11 2005.

\* cited by examiner

METHODS OF HYDRAULIC FRACTURING AND OF PROPPING FRACTURES IN SUBTERRANEAN FORMATIONS

BACKGROUND

The present invention relates to hydraulic fracturing operations and, more particularly, to methods of hydraulic fracturing and methods of propping fractures during such hydraulic fracturing operations.

Hydrocarbon-producing wells are often stimulated by hydraulic fracturing operations. In hydraulic fracturing operations, a viscous fracturing fluid, which also functions as a carrier fluid, is pumped into a producing zone at a rate and pressure such that the subterranean formation breaks down and at least one fracture is formed in the zone. Typically, particulate solids, such as sand, suspended in a portion of the fracturing fluid are then deposited in the fractures. These particulate solids, commonly referred to as "proppant particulates," serve to prevent the fractures from fully closing so that conductive channels are formed through which produced hydrocarbons can flow.

The proppant particulates used to prevent fractures from fully closing generally are particulate solids, such as sand, bauxite, ceramics, or nut hulls, which are deposited into fractures using traditional high proppant loading techniques. The proppant particulates and loading techniques suffer from an assortment of drawbacks that can limit the production potential of the well. The degree of success of a fracturing operation depends, at least in part, upon the resultant fracture porosity and conductivity once the fracturing operation is stopped and production is begun. Traditional fracturing operations place a large volume of proppant particulates into a fracture, and the porosity of the resultant packed, propped fracture is then at least partially related to the interconnected interstitial spaces between the abutting proppant particulates.

An alternative fracturing operation involves placing a much reduced volume of proppant in a fracture to create a high porosity fracture. As referred to herein, a "high porosity fracture" refers to a fracture that exhibits a porosity of greater than about 40%, after the fracture has closed or applied a substantial mechanical stress. In such operations, the proppant particulates within the fracture may be widely spaced but they are still sufficient to hold the fracture open and allow for production. Such operations allow for increased fracture conductivity due, at least in part, to the fact that the produced fluids may flow around widely spaced proppant particulates rather than just through the relatively small interstitial spaces in a packed proppant bed. While this fracturing concept has been investigated in the industry, the concept has not been successfully applied for a number of reasons. Among other things, loading techniques have not been developed that can appropriately place the proppant particulates so as to provide the desired fracture conductively.

SUMMARY

The present invention relates to hydraulic fracturing operations and, more particularly, to methods of hydraulic fracturing and methods of propping fractures during such hydraulic fracturing operations.

In one embodiment, the present invention provides a method of fracturing a subterranean formation penetrated by a well bore, the method comprising: introducing a fracturing fluid into the well bore at or above a pressure sufficient to create or enhance at least one fracture in the subterranean formation; forming a plurality of proppant aggregates, each proppant aggregate comprising a binding fluid and a filler material; and introducing the plurality of proppant aggregates into the at least one fracture.

In another embodiment, the present invention provides a method of fracturing a subterranean formation penetrated by a well bore, the method comprising: introducing a fracturing fluid into the well bore at or above a pressure sufficient to create or enhance at least one fracture in the subterranean formation; forming a plurality of proppant aggregates, each proppant aggregate comprising a curable resin composition and a filler material, the curable resin composition comprising a resin; and introducing the plurality of proppant aggregates into the at least one fracture.

In another embodiment, the present invention provides a method of fracturing a subterranean formation penetrated by a well bore, the method comprising: introducing a fracturing fluid into the well bore at or above a pressure sufficient to create or enhance at least one fracture in the subterranean formation; forming a plurality of proppant aggregates, each proppant aggregate comprising an aqueous gel and a filler material; and introducing the plurality of proppant aggregates into the at least one fracture.

In another embodiment, the present invention provides a method of propping at least one fracture in a subterranean formation, the method comprising: forming a plurality of proppant aggregates, each proppant aggregate comprising a binding fluid and a filler material; and introducing the plurality of proppant aggregates into the at least one fracture.

In yet another embodiment, the present invention provides a method of propping at least one fracture in a subterranean formation, the method comprising: forming a plurality of proppant aggregates, each proppant aggregate comprising a binding fluid and a filler material, wherein the filler material is present in each proppant aggregate in an amount in the range of from about 1 pound to about 35 pounds per gallon of the binding fluid present in each proppant aggregate; suspending the plurality of proppant aggregates in a carrier fluid; introducing the carrier fluid into the at least one fracture, the carrier fluid containing the plurality of proppant aggregates suspended therein; depositing at least a portion of the proppant aggregates within the at least one fracture; and recovering at least a portion of the carrier fluid from the at least one fracture, wherein a substantial portion of the plurality of proppant aggregates remain in the at least one fracture.

The features and advantages of the present invention will be readily apparent to those skilled in the art upon a reading of the description of the specific embodiments that follows.

DRAWINGS

A more complete understanding of the present disclosure and advantages thereof may be acquired by referring to the following description taken in conjunction with the accompanying drawings, wherein.

Figure 1A:
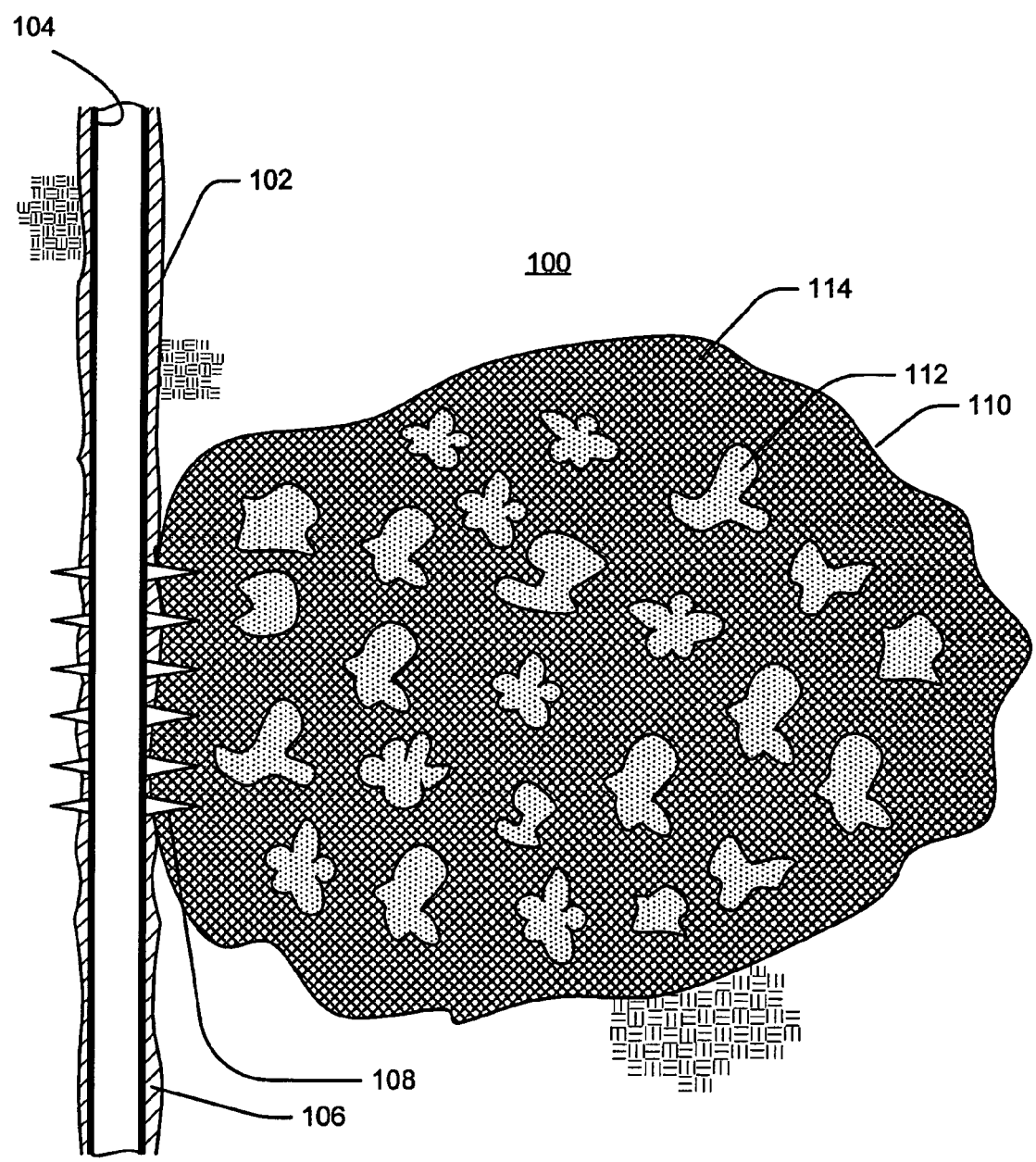
FIGS. 1A and 1B depict a schematic of a fracture that includes a plurality of proppant aggregates before recovery of a carrier fluid in accordance with an embodiment of the present invention.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION

The present invention relates to hydraulic fracturing operations and, more particularly, to methods of hydraulic fracturing and methods of propping fractures during such hydraulic fracturing operations.

In one embodiment, the present invention provides a method of fracturing a subterranean formation penetrated by a well bore, the method comprising introducing a fracturing fluid into the well bore at or above a pressure sufficient to create or enhance at least one fracture in the subterranean formation; forming a plurality of proppant aggregates, each proppant aggregate comprising a binding fluid and a filler material; and introducing the plurality of proppant aggregates into the at least one fracture. As used herein, the term "aggregate(s)" refers to a coherent body, such that when the aggregate is placed into the fracture(s) or into a carrier fluid, the aggregate should not become dispersed into smaller bodies without application of shear. As used herein, the term "binding fluid" refers to a fluid that confines the proppant aggregate, such that when the proppant aggregate is placed into a fracture or placed into a carrier fluid, the proppant aggregate remains a coherent body that does not generally become dispersed into smaller bodies without application of shear.

Generally, the plurality of proppant aggregates are introduced into the fracture(s) simultaneously with or proximate to the introduction of a carrier fluid into the fracture(s). Introduction of the proppant aggregates and the carrier fluid into the fracture(s) should be continued until a desired fracturing treatment design is achieved. The fracturing treatment design should be similar to conventional hydraulic fracturing treatments, except for the proppant stage where its composition and placement are described herein. In some embodiments, the fracturing fluid and the carrier fluid may be the same fluids.

Due to their placement into the fracture(s) in conjunction with or proximate to the carrier fluid, the masses of the proppant slurry should be distributed throughout the fracture(s), wherein the spaces between each of proppant aggregate contain the carrier fluid. After a desired period of time (e.g., a shut-in period), at least a portion of the carrier fluid should be recovered from the fracture(s), for example, by producing the carrier fluid out of the well bore during flow back cleanup or by recovering the carrier fluid during or prior to production of the well bore. The plurality of proppant aggregates should have sufficient viscosity and/or have cured into a plurality of hardened masses (e.g., hardened proppant aggregates) so that at least a substantial portion (and preferably almost all) of the plurality of proppant aggregates are not recovered from the fracture(s) during flow back cleanup, before or during production of the well. However, it is recognized that, in some instances, a small portion of the plurality of proppant aggregates may be recovered. Recovery of the carrier fluid from the fracture(s) should result in voids surrounding the plurality of proppant aggregates distributed throughout the fracture(s), wherein the voids provide flow paths through which produced hydrocarbons can flow.

Certain methods of the present invention comprise forming a plurality of proppant aggregates. It is believed that the plurality of proppant aggregates may be any of a variety of shapes, including ovals, spheroids, stringy masses with irregular shapes and sizes, combinations thereof, and the like. As those of ordinary skill in the art will appreciate, the proppant aggregates may have a well-defined physical shape or may have an irregular geometry. In some embodiments, it may be desirable for each proppant aggregate to be substantially the same size.

A variety of methodologies may be used to form the plurality of proppant aggregates and introduce them into the fracture(s). In one example, to form the plurality of proppant aggregates, a proppant slurry should be provided. Because the proppant slurry is used to form the proppant aggregates, the proppant aggregates will have substantially the same composition as the proppant slurry, namely both the proppant aggregates and the proppant slurry generally comprise a binding fluid and a filler material. A carrier fluid should also be provided. The carrier fluid and the proppant slurry will be discussed in more detail below. In one embodiment, predetermined volumes of the proppant slurry may be pumped intermittently into the well bore so that a plurality of proppant aggregates may be introduced into the fracture (s). In these embodiments, the proppant slurry may be alternately pumped into the well bore with carrier fluid. For example, a first portion of the carrier fluid may be being introduced into the well bore. After introduction of the first portion, a predetermined volume of the proppant slurry may be introduced into the well bore. In some embodiments, the predetermined volume of the proppant slurry may be in the range of from about 0.01 gallon to about 5 gallons. However, one of ordinary skill in the art, with the benefit of this disclosure, will recognize that larger volumes of the proppant slurry may be used, dependent upon, for example, the dimensions of the fracture(s). Once the predetermined volume of the proppant slurry has been introduced into the well bore, a second portion of the carrier fluid may be introduced into the well bore, thereby forming a proppant aggregate in the well bore, the proppant aggregate spaced between the first and second portions. These steps may be repeated until the desired amount of proppant aggregates have been formed and introduced into the fracture(s). The predetermined volumes of the proppant slurry that are being alternately pumped may remain constant or may be varied, such that the plurality of proppant aggregates introduced into the fracture(s) are of varying sizes and shapes.

In another embodiment, the proppant slurry is combined with the carrier fluid so that the proppant slurry forms a plurality of proppant aggregates in the carrier fluid. Among other things, in these embodiments, the plurality of proppant aggregates should be suspended in the carrier fluid, carried by the carrier fluid into the fracture(s), and distributed within the fracture(s). In such embodiments, at least a portion of the proppant aggregates may be deposited within the fracture(s), for example, after the carrier fluid's viscosity is reduced. Generally, in these embodiments, the proppant slurry should be combined with the carrier fluid prior to introducing the carrier fluid into the well bore. Where the proppant slurry contains a curable resin composition (as will be discussed further below), the proppant slurry is preferably combined with the carrier fluid downstream of the blending and/or pumping equipment, among other things, to reduce coating of the curable resin composition onto such equipment and to minimize the interaction of the proppant slurry and the carrier fluid. In one embodiment, the plurality of proppant aggregates are formed by shearing (or cutting) the proppant slurry as it is combined with the carrier fluid, e.g., as it is pumped and extruded from a container into a different container that contains the carrier fluid. In one certain embodiment where the proppant slurry is combined with the carrier fluid, predetermined volumes of the proppant slurry are intermittently injected into the carrier fluid that is being introduced into the well bore. The predetermined volumes of the proppant slurry that are being intermittently injected into the carrier fluid may remain constant or may be varied, such that the proppant aggregates form in the carrier fluid in varying sizes and shapes. In some embodiments, each predetermined volume of the proppant slurry may be in the range of from about 0.01 gallon to about 5 gallons. However, one of ordinary skill in the art, with the benefit of this disclosure, will recognize that larger volumes of the proppant slurry may be used, dependent upon, for example, the dimensions of the fracture(s).

In another embodiment, formation of the plurality of proppant aggregates comprises simultaneously introducing the carrier fluid and the proppant slurry into the fracture(s). In these embodiments, the carrier fluid and the proppant slurry may be introduced into the fracture(s) via separate flow paths, so at to form a plurality of proppant aggregates. For example, one of the fluids (e.g., the carrier fluid or the proppant slurry) may be introduced into the fracture(s) via a conduit (e.g., coiled tubing or jointed pipe) that is disposed within the well bore, while the other fluid (e.g., the carrier fluid or the proppant slurry) may be introduced into the fracture(s) via an annulus defined between the tubing and the casing. As the proppant slurry and the carrier fluid are cointroduced into the fracture(s), the plurality of proppant aggregates should form and be distributed within the fracture(s). Among other things, this may minimize interaction between the carrier fluid and the plurality of proppant aggregates and also may enhance the formation of layers between the two fluids. An example of a suitable fracturing technique that involves coinjection of fluids down a conduit and an annulus is described in U.S. Pat. No. 5,765,642, the relevant disclosure of which is incorporated herein by reference. One of ordinary skill, with the benefit of this disclosure, will recognize other suitable methods for forming the proppant aggregates and introducing them into the fracture(s), dependent upon the particular application.

In accordance with the above described steps, the plurality of proppant aggregates should be introduced into the fracture(s) so that the proppant aggregates are distributed through the length and height of the fracture(s) without packing or stacking together. It is preferred that the proppant aggregates are randomly distributed throughout the length and height of the fracture(s). Despite the preference in forming partial monolayers of proppant aggregates in the fracture(s), the potential for forming a full monolayer or a packed portion in the fracture always exists due to, among other things, uneven distribution of the proppant aggregates, undesired accumulation of the proppant aggregates, or particle settling at one location. FIG. 1A depicts a plurality of proppant aggregates 112 distributed throughout fracture 110 in a partial monolayer arrangement.

Generally, the ratio of the plurality of proppant aggregates to carrier fluid introduced into the fracture(s) will vary, depending on the compositions of the proppant aggregates and the carrier fluid, the closure stress applied on the proppant aggregates, formation characteristics and conditions, the desired conductivity of the fracture, the amount of the carrier fluid that can be removed from the fracture(s), and other factors known to those of ordinary skill in the art. As will be understood by those of ordinary skill in the art, with the benefit of this disclosure, the higher the ratio of the plurality of proppant aggregates to carrier fluid introduced into the fracture(s), the less void channels or less conductive fractures will result. In some embodiments, for example, in high Young's modulus formations (e.g., greater than about $1 \times 10^6$ psi), the ratio of the plurality of proppant aggregates to carrier fluid introduced into the fracture(s) is in the range of from about 1:9 by volume to about 8:2 by volume. In some embodiments, for example, in low Young's modulus formations (e.g., less than about $5 \times 10^5$ psi), the ratio of the plurality of proppant aggregates to carrier fluid introduced into the fracture(s) is in the range of from about 4:6 by volume to about 6:4 by volume.

According to the methods of the present invention, after placement of the proppant slurry into the fracture(s), the well bore may be shut in for a period of time. The necessary period of time for the shut-in period is dependent, among other things, on the composition of the proppant aggregates used and the temperature of the formation. Generally, the chosen period of time may be up from a few hours to about 72 hours, or longer, depending on the composition used in preparing the binding fluid and proppant slurry. Determining the proper period of time to shut in the formation is within the ability of one skilled in the art, with the benefit of this disclosure. For example, in some embodiments, the shut-in period may be sufficient to allow the carrier fluid to break so that the carrier fluid may be recovered from the well, for example, during well cleanup flow back and/or during production of the well.

Furthermore, in another embodiment, where the binding fluid contained in the proppant aggregates comprises a curable resin composition, the shut-in period may be sufficient to allow each proppant aggregate slurry to cure into a hardened mass (e.g., a hardened proppant aggregate) capable of preventing the fracture(s) from fully closing. In some embodiments, a portion of the proppant aggregates introduced into the at least one fracture are cured. In another embodiment, substantially all of the proppant introduced into the at least one fracture are cured. In yet another embodiment, all of the proppant introduced into the at least one fracture are cured. Generally, in these embodiments, the proppant aggregates should cure to form multiple hardened masses within the fracture(s). Each hardened mass within the fracture(s) may be formed from the curing of one or more proppant aggregates. For example, a hardened mass may be formed from the curing of a single proppant aggregate. Further, in one example, two or more hardened masses may be formed from a single proppant aggregate that has become dispersed into smaller bodies within the at least one fracture. In another example, a hardened mass may be formed from multiple proppant aggregates that have agglomerated within the fracture and cured into a single hardened mass. However, to provide maximum fracture conductivity, at least a substantial portion (and preferably substantially all) of the proppant aggregates should not agglomerate within the fracture(s), but should instead be distributed throughout the fracture(s).

Among other things, once placed within the fracture(s) and/or after a desired shut-in period, the plurality of proppant aggregates should act as proppant particulates that prevent the fracture(s) from fully closing, while providing for conductive channels through which produced hydrocarbons may be produced. Accordingly, the plurality of proppant aggregates should not flow back when the well is placed into production. Depending on the ratio of the plurality of proppant aggregates to the carrier fluid placed into the fracture(s), the compositions of the proppant aggregates and the carrier fluid, the closure stress applied on the proppant aggregates, how much of the fracture fluid can be removed, and a variety of other factors, use of the proppant aggregates to prop the fracture(s) may provide for a higher porosity fracture than can be achieved using conventional packed proppant beds. For example, it is believed that the methods of the present invention may be used to facilitate the formation of propped fractures having a porosity greater than about 40% while maintaining enough conductive channels for production. Some embodiments of the present invention may be used to form high porosity propped fractures exhibiting a porosity of at least about 50%. Other embodiments of the present invention may be used to form high porosity propped fractures exhibiting a porosity of at least about 60%. Other embodiments of the present invention may be used to form high porosity propped fractures exhibiting a porosity of at least about 70%. Other embodiments of the present invention may be used to form high porosity propped fractures exhibiting a porosity of at least about 80%. Other embodiments of the present invention may be used to form high porosity propped fractures exhibiting a porosity of at least about 90%. Porosity values expressed herein are stressed porosities, that is, the porosity after the fracture has closed or applied a substantial mechanical stress.

Figure 1B:
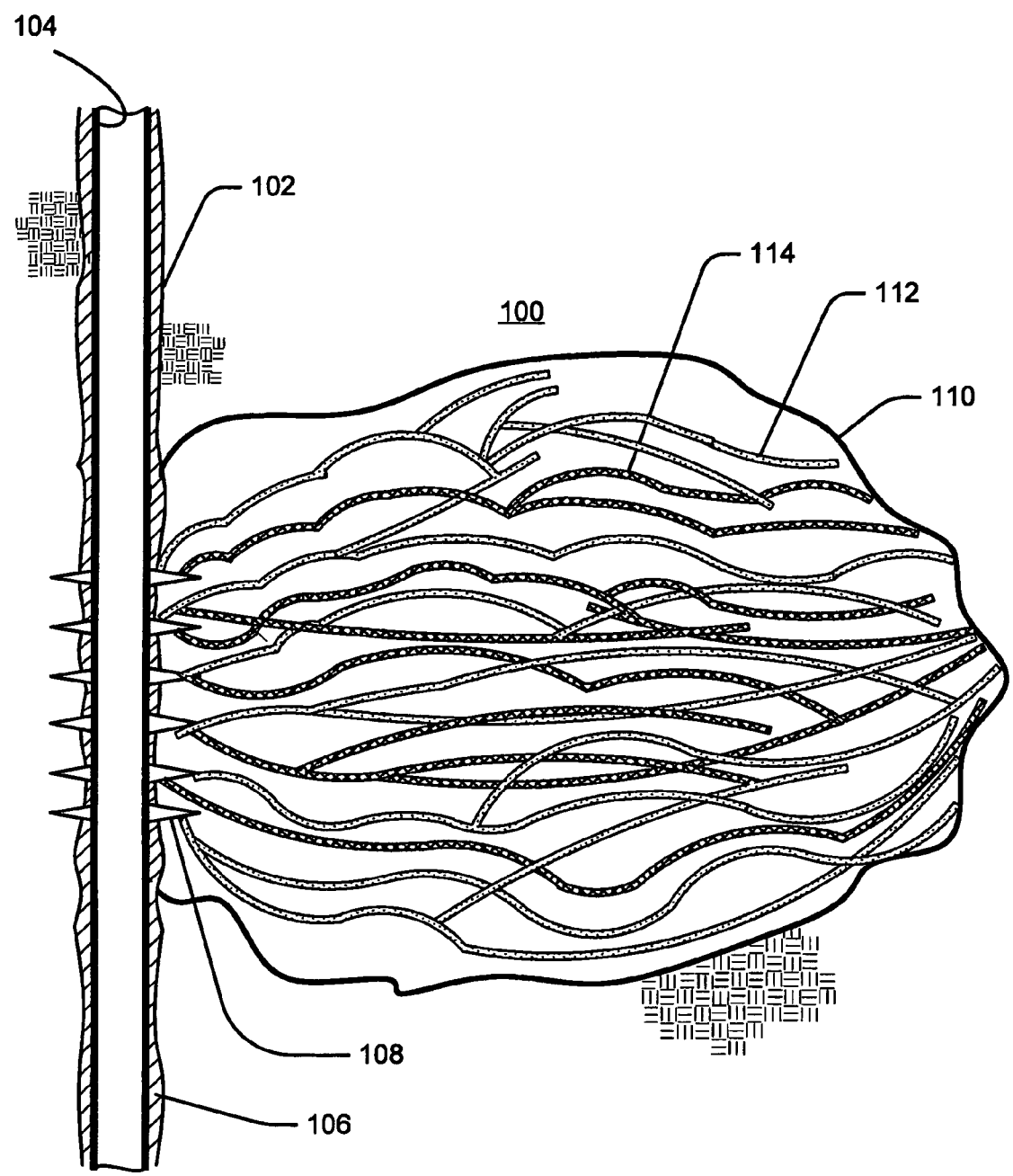

Referring now to FIGS. 1A and 1B, certain embodiments of the present invention are illustrated after introduction of a plurality of proppant aggregates and a carrier fluid into the fracture(s) in a subterranean formation. Subterranean formation 100 is shown penetrated by well bore 102. While FIGS. 1A and 1B depict well bore 102 as a generally vertical well, the methods of the present invention also may be performed in generally horizontal, inclined, or otherwise formed portions of wells. In addition, well bore 102, may be a primary well bore having one or more branch well bores extending therefrom, or well bore 102 may be a branch well bore extending laterally from a primary well bore. Generally, well bore 102 should be lined with casing 104 that is cemented to subterranean formation 100 by cement sheath 106, inter alia, to maintain well bore integrity. Those of ordinary skill in the art will appreciate the circumstances when well bore 102 should or should not be cased and whether such casing should or should not be cemented. Indeed, the present invention does not lie in whether or not to case a well bore, or if so, how. One or more perforations 108 are shown that extend through casing 104 and cement sheath 106 into subterranean formation 100. The one or more perforations 108 in casing 104 and cement sheath 106 may be created using any suitable technique. Furthermore, a fracture in subterranean formation 100 is depicted by FIGS. 1A and 1B as fracture 110 that extends in an essentially vertical plane that is approximately longitudinal or parallel to the axis of well bore 102. In addition, plurality of proppant aggregates 112 is shown distributed in fracture 110. As discussed above, plurality of proppant aggregates 112 may be formed in a variety of shapes, as depicted by FIGS. 1A and 1B. The spaces in fracture 110 between each of plurality of proppant aggregates 112 contain carrier fluid 114.

Figure 2A:
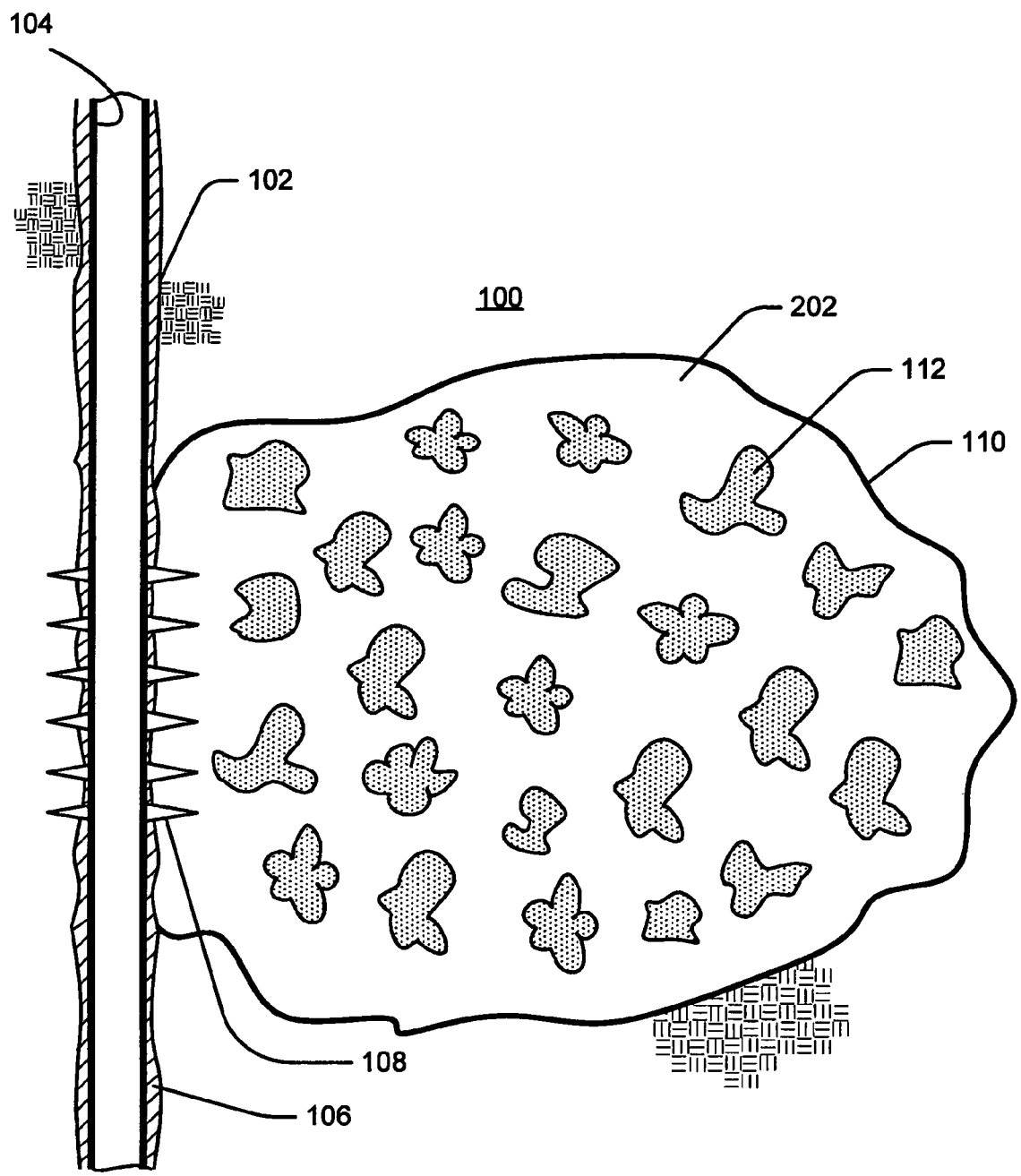
FIGS. 2A and 2B depict the schematic fracture of FIGS. 1A and 1B containing a proppant slurry of the present invention after recovery of a carrier fluid in accordance with one embodiment of the present invention.
Figure 2B:
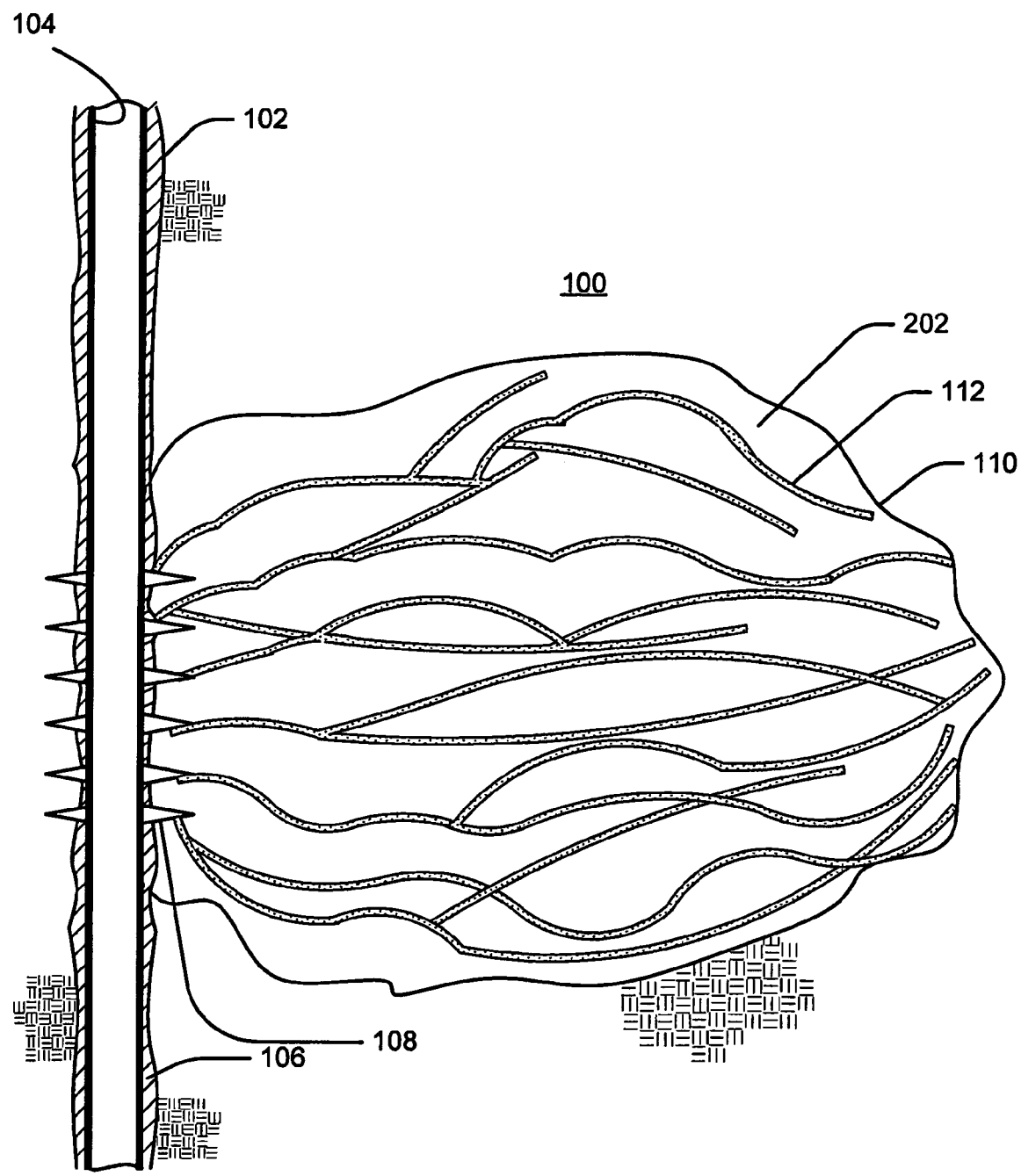

As will be discussed in more detail below, after a desired period of time (e.g., a shut-in period), carrier fluid 114 may be recovered from fracture 110. Referring now to FIGS. 2A and 2B, fracture 110 is depicted after carrier fluid 114 (shown in FIGS. 1A and 1B) has been recovered. Plurality of proppant aggregates 112 remains in fracture 110 after recovery of carrier fluid 114 therefrom. Due to the recovery of carrier fluid 114, voids 202 in the spaces between the plurality of proppant aggregates 112 provide flow paths for the production of hydrocarbons from subterranean formation 100.

As discussed above, formation of the plurality of proppant aggregates generally comprises the provision of a proppant slurry, the proppant slurry containing a binding fluid and a filler material. Additionally, in some embodiments, the proppant slurry may further comprise other additives such as degradable particles. Because the proppant slurry is used to form the proppant aggregates, the proppant aggregates will have substantially the same composition as the proppant slurry Binding fluids suitable for use in the present invention include curable resin compositions and aqueous gels. Generally, the binding fluid should be immiscible or at least partially immiscible with the carrier fluid so that the proppant aggregates remain a coherent body when contacted by or combined with the carrier fluid. For example, in some embodiments, the proppant slurry may be used to form a plurality of proppant aggregates, which will be suspended in the carrier fluid. In these embodiments, the binding fluid should allow each of the proppant aggregates to remain a coherent body when suspended in the carrier fluid.

Curable resin compositions suitable for use in the binding fluids of the present invention generally comprise any suitable resin that is capable of forming a hardened, consolidated mass. Many such resins are commonly used in subterranean consolidation operations, and some suitable resins include two-component epoxy-based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped downhole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable resin for use in embodiments of the present invention and to determine whether a catalyst is required to trigger curing.

Optionally, the curable resin composition further may contain a solvent. Any solvent that is compatible with the resin and achieves the desired viscosity effect is suitable for use in the present invention. The solvents that can be used in the present invention preferably include those having high flash points (most preferably above about 125° F.). Examples of solvents suitable for use in the present invention include, but are not limited to, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d'limonene, 2-butoxy ethanol, butyl acetate, furfuryl acetate, butyl lactate, dimethyl sulfoxide, dimethyl formamide, fatty acid methyl esters, and combinations thereof. It is within the ability of one skilled in the art, with the benefit of this disclosure, to determine whether and how much solvent is needed to achieve a suitable viscosity.

Suitable aqueous gels are generally comprised of water and one or more gelling agents. In certain embodiments of the present invention, the confining fluid is an aqueous gel comprised of water, a gelling agent for gelling the water and increasing its viscosity, and, optionally, a crosslinking agent for crosslinking the gel and further increasing the viscosity of the fluid. The increased viscosity of the gelled, or gelled and cross-linked, confining fluid, inter alia, allows the confining fluid to transport significant quantities of suspended filler material and allows the proppant slurry to remain a coherent mass. Furthermore, it is desired for the aqueous gel to maintain its viscosity after placement into the fracture(s) in the subterranean formation. Accordingly, the components of the aqueous gel should be selected so that, when exposed to downhole conditions (e.g., temperature, pH, etc.), it does not experience a breakdown or deterioration of the gel structure nor do the proppant aggregates experience a breakdown or deterioration. Furthermore, no gel breakers should be included in the aqueous gel so that it does not break down and flow back, e.g., when the well is placed in production.

The water used to form the aqueous gel may be fresh water, saltwater, brine, or any other aqueous liquid that does not adversely react with the other components. The density of the water can be increased to provide additional particle transport and suspension in the present invention. The aqueous gels may also include one or more of a variety of well-known additives, such as gel stabilizers, fluid loss control additives, clay stabilizers, bactericides, and the like.

A variety of gelling agents may be used, including hydratable polymers that contain one or more functional groups, such as hydroxyl, carboxyl, sulfate, sulfonate, amino, or amide groups. Suitable gelling agents typically comprise biopolymers, synthetic polymers, or a combination thereof. A variety of gelling agents can be used in conjunction with the methods and compositions of the present invention, including, but not limited to, hydratable polymers that contain one or more functional groups such as hydroxyl, cis-hydroxyl, carboxylic acids, derivatives of carboxylic acids, sulfate, sulfonate, phosphate, phosphonate, amino, or amide. In certain exemplary embodiments, the gelling agents may be biopolymers comprising polysaccharides, and derivatives thereof that contain one or more of these monosaccharide units: galactose, mannose, glucoside, glucose, xylose, arabinose, fructose, glucuronic acid, or pyranosyl sulfate. Examples of suitable polymers include, but are not limited to, xanthan gum, guar gum and derivatives thereof (such as hydroxypropyl guar and carboxymethylhydroxypropyl guar), and cellulose derivatives (such as hydroxyethyl cellulose). Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other exemplary embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091, the relevant disclosure of which is incorporated herein by reference. Suitable gelling agents generally are present in the aqueous gels of the present invention in an amount in the range of from about 0.1% to about 5% by weight of the water therein. In certain exemplary embodiments, the gelling agents are present in the aqueous gels of the present invention in an amount in the range of from about 0.01% to about 2% by weight of the water therein.

Crosslinking agents may be used to crosslink gelling agent molecules to form crosslinked gelling agents. Crosslinking agents typically comprise at least one metal ion that is capable of crosslinking polymer molecules. Examples of suitable crosslinking agents include, but are not limited to, borate compounds (such as, for example, alkaline earth metal borates, alkali metal-alkaline earth borates, and mixtures thereof); zirconium compounds (such as, for example, zirconium lactate, zirconium lactate triethanolamine, zirconium carbonate, zirconium acetylacetonate, zirconium malate, zirconium citrate, and zirconium diisopropylamine lactate); titanium compounds (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; or a combination thereof. Examples of suitable borate-based crosslinking agents are described in U.S. Pat. No. 6,024,170, the relevant disclosure of which is incorporated herein by reference. Examples of suitable borate compounds include probertite, ulexite, nobleite, frolovite, colemanite, calcined colemanite, priceite, paternoite, hydroboracite, kaliborite, and other similar borates. Of the various slightly water-soluble borate compounds that may be used, colemanite, calcine colemanite, and ulexite are preferred, with colemanite being the most preferred. An example of a suitable commercially available borate-based crosslinking agent is the "BC-140™" crosslinking agent available from Halliburton Energy Services, Inc., Duncan, Okla. An example of a suitable commercially available zirconium-based crosslinking agent is the "CL-24™" crosslinking agent available from Halliburton Energy Services, Inc., Duncan, Okla. An example of a suitable commercially available titanium-based crosslinking agent is the "CL-39™" crosslinking agent available from Halliburton Energy Services, Inc., Duncan Okla. Suitable crosslinking agents generally are present in the aqueous gels of the present invention in an amount sufficient to provide, inter alia, the desired degree of crosslinking between gelling agent molecules. In certain exemplary embodiments of the present invention, a crosslinking agent may be present in an amount in the range from about 0.001% to about 10% by weight of the water in the aqueous gel. In certain exemplary embodiments of the present invention, a crosslinking agent may be present in the aqueous gels of the present invention in an amount in the range from about 0.01% to about 1% by weight of the water therein. Individuals skilled in the art, with the benefit of this disclosure, will recognize the exact type and amount of crosslinking agents to use, depending on factors such as the specific gelling agent, desired viscosity, and formation conditions.

Filler materials suitable for use in the present invention may comprise a variety of materials suitable for use in subterranean operations, including, but not limited to, sand (such as beach sand, desert sand, or graded sand), bauxite; ceramic materials; glass materials (such as crushed, disposal glass material); polymer materials; Teflon® materials; nut shell pieces; seed shell pieces; cured resinous particulates comprising nut shell pieces; cured resinous particulates comprising seed shell pieces; fruit pit pieces; cured resinous particulates comprising fruit pit pieces; wood; composite particulates, lightweight particulates, microsphere plastic beads, ceramic microspheres, glass microspheres, man-made fibers, cements (such as Portland cements), fly ash, carbon black powder, combinations thereof, and the like. Suitable composite materials may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. Generally, the filler material should form a stable aggregate with the binding fluid. The appropriate filler material to include in the proppant slurry depends on a number of factors, including the selected binding fluid, the ability to control density of the binding fluid, and the structural flexibility or firmness of the masses of the proppant slurry. For example, where the binding fluid comprises an aqueous gel, the filler material should act, inter alia, as proppant particulates and thus should be capable of preventing the fractures from fully closing. In other embodiments, where the binding fluid comprises a curable resin composition, the filler material is included in the proppant slurry, inter alia, to enhance the compressive strength of the proppant slurry after curing of the resin therein. In addition to supporting the fracture, the filler material also may act to prevent leakoff of the binding fluid into the subterranean formation.

The filler material may be provided in a wide variety of particle sizes. The average particulate sizes generally may range from about 2 mesh to about 400 mesh on the U.S. Sieve Series; however, it is to be understood that in certain circumstances, other sizes may be desired and will be entirely suitable for practice of the present invention. In some embodiments, for example, where the filler material has a specific gravity of greater than 2, the filler material may be present in the proppant slurry in an amount in the range of from about 1 pound to about 35 pounds per gallon of the binding fluid. In some embodiments, for example, where the filler material has a specific gravity of less than about 2, the filler material may be present in the proppant slurry in an amount in the range of from about 0.1 pound to about 10 pounds per gallon of the binding fluid. One of ordinary skill in the art, with the benefit of this disclosure, will be able to select the appropriate type, size, and amount of filler material to include in the proppant slurry for a particular application.

Optionally, the filler material may be coated with an adhesive substance. As used herein, the term "adhesive substance" refers to a material that is capable of being coated onto a particulate and that exhibits a sticky or tacky character such that the filler material that has adhesive thereon has a tendency to create clusters or aggregates. As used herein, the term "tacky," in all of its forms, generally refers to a substance having a nature such that it is (or may be activated to become) somewhat sticky to the touch. Generally, the filler material may be coated with an adhesive material where the binding fluid is not a curable resin composition. Examples of adhesive substances suitable for use in the present invention include non-aqueous tackifying agents; aqueous tackifying agents; silyl-modified polyamides; curable resin compositions that are capable of curing to form hardened substances; and combinations thereof. Among other things, the adhesive substances, in conjunction with the binding fluid, encourage the filler materials to form aggregates, preventing the filler material from being dispersed within the fractures, so that the filler materials aggregate even if the binding fluid that is confining the filler material becomes deteriorated after prolonged exposure to downhole conditions. Adhesive substances may be applied on-the-fly, applying the adhesive substance to the filler material at the well site, directly prior to pumping the proppant slurry into the well bore.

Tackifying agents suitable for coating the fillers materials comprise any compound that, when in liquid form or in a solvent solution, will form a non-hardening coating upon a particulate. A particularly preferred group of tackifying agents comprise polyamides that are liquids or in solution at the temperature of the subterranean formation such that they are, by themselves, non-hardening when introduced into the subterranean formation. A particularly preferred product is a condensation reaction product comprised of commercially available polyacids and a polyamine. Such commercial products include compounds such as mixtures of $C_{36}$ dibasic acids containing some trimer and higher oligomers, and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as tackifying compounds include liquids and solutions of, for example, polyesters, polycarbonates and polycarbamates, natural resins such as shellac and the like. Other suitable tackifying agents are described in U.S. Pat. Nos. 5,853,048 and 5,833,000, the relevant disclosures of which are herein incorporated herein by reference.

Tackifying agents suitable for coating the filler materials may be either used such that they form non-hardening coating, or they may be combined with a multifunctional material capable of reacting with the tackifying compound to form a hardened coating. A "hardened coating," as used herein, means that the reaction of the tackifying compound with the multifunctional material will result in a substantially non-flowable reaction product that exhibits a higher compressive strength in a consolidated agglomerate than the tackifying compound alone with the particulates. In this instance, the tackifying agent may function similarly to a hardenable resin. Multifunctional materials suitable for use in the present invention include, but are not limited to, aldehydes (such as formaldehyde), dialdehydes (such as glutaraldehyde), hemiacetals or aldehyde releasing compounds, diacid halides, dihalides (such as dichlorides and dibromides), polyacid anhydrides (such as citric acid), epoxides, furfuraldehyde, glutaraldehyde or aldehyde condensates and the like, and combinations thereof. In some embodiments of the present invention, the multifunctional material may be mixed with the tackifying compound in an amount of from about 0.01% to about 50% by weight of the tackifying compound to effect formation of the reaction product. In some preferable embodiments, the compound is present in an amount of from about 0.5% to about 1% by weight of the tackifying compound. Suitable multifunctional materials are described in U.S. Pat. No. 5,839,510, the relevant disclosure of which is incorporated herein by reference. Other suitable tackifying agents are described in U.S. Pat. No. 5,853,048.

Solvents suitable for use with the tackifying agents of the present invention include any solvent that is compatible with the tackifying agent and achieves the desired viscosity effect. The solvents that can be used in the present invention preferably include those having high flash points (most preferably above about 125° F.). Examples of solvents suitable for use in the present invention include, but are not limited to, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d'limonene, 2-butoxy ethanol, butyl acetate, furfuryl acetate, butyl lactate, dimethyl sulfoxide, dimethyl formamide, fatty acid methyl esters, and combinations thereof. It is within the ability of one skilled in the art, with the benefit of this disclosure, to determine whether a solvent is needed to achieve a viscosity suitable to the subterranean conditions and, if so, how much.

Suitable aqueous tackifier agents are capable of forming at least a partial coating upon the surface of the first particulates. Generally, suitable aqueous tackifier agents are not significantly tacky when placed onto a particulate, but are capable of being "activated" (that is destabilized, coalesced, and/or reacted) to transform the compound into a sticky, tackifying compound at a desirable time. Such activation may occur before, during, or after the aqueous tackifier compound is placed in the subterranean formation. In some embodiments, a pretreatment may be first contacted with the surface of a particulate to prepare it to be coated with an aqueous tackifier compound. Suitable aqueous tackifying agents are generally charged polymers that comprise compounds that, when in an aqueous solvent or solution, will form a non-hardening coating (by itself or with an activator) and, when placed on a particulate, will increase the continuous critical re-suspension velocity of the particulate when contacted by a stream of water. The term "continuous critical re-suspension velocity" is described in U.S. Pat. No. 6,209,643, the relevant disclosure of which is incorporated herein by reference.

Examples of aqueous tackifier agents suitable for use in the present invention include, but are not limited to, acrylic acid polymers, acrylic acid ester polymers, acrylic acid derivative polymers, acrylic acid homopolymers, acrylic acid ester homopolymers (such as poly(methyl acrylate), poly (butyl acrylate), and poly(2-ethylhexyl acrylate)), acrylic acid ester co-polymers, methacrylic acid derivative polymers, methacrylic acid homopolymers, methacrylic acid ester homopolymers (such as poly(methyl methacrylate), poly(butyl methacrylate), and poly(2-ethylhexyl methacrylate)), acrylamido-methyl-propane sulfonate polymers, acrylamido-methyl-propane sulfonate derivative polymers, acrylamido-methyl-propane sulfonate co-polymers, and acrylic acid/acrylamido-methyl-propane sulfonate co-polymers and combinations thereof. Methods of determining suitable aqueous tackifier agents and additional disclosure on aqueous tackifier agents can be found in U.S. patent application Ser. No. 10/864,061, filed Jun. 9, 2004, and U.S. patent application Ser. No. 10/864,618, filed Jun. 9, 2004, the relevant disclosures of which are incorporated herein by reference.

Silyl-modified polyamide compounds suitable for use as an adhesive substance in the methods of the present invention may be described as substantially self-hardening compositions that are capable of at least partially adhering to particulates in the unhardened state, and that are further capable of self-hardening themselves to a substantially non-tacky state to which individual particulates such as formation fines will not adhere. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309, the relevant disclosure of which is incorporated herein by reference.

Curable resin compositions suitable for use as an adhesive substance in the methods of the present invention generally comprise any suitable resin that is capable of forming a hardened, consolidated mass. Many such resins are commonly used in subterranean consolidation operations, and some suitable resins include two-component epoxy-based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped down hole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable resin for use in embodiments of the present invention and to determine whether a catalyst is required to trigger curing.

Further, the curable resin composition further may contain a solvent. Any solvent that is compatible with the resin and achieves the desired viscosity effect is suitable for use in the present invention. Preferred solvents include those listed above in connection with tackifying agents. It is within the ability of one skilled in the art, with the benefit of this disclosure, to determine whether and how much solvent is needed to achieve a suitable viscosity.

Optionally, the proppant slurry may further comprise degradable particles. One purpose of including degradable particles in the proppant slurry is to ensure the permeability of the propped fracture. Despite the preference in forming partial monolayers of the proppant slurry, the potential for forming a full monolayer or a packed portion in the fracture exists due to, among other things, uneven distribution of the proppant slurry, undesired accumulation of the proppant slurry, or particle settling. As the degradable particles degrade with time, the porosity of the propped fracture increases. The degradable particles are preferably substantially uniformly distributed throughout the proppant slurry and, in turn, the proppant aggregates. Over time, the degradable particle will degrade in situ, causing the degradable particles to substantially be removed from the proppant aggregates and to leave behind voids in the proppant aggregates. These voids enhance the porosity of the proppant aggregates, which may result, inter alia, in enhanced conductivity.

Generally, the degradable particles comprise a degradable material. Degradable materials that may be used in conjunction with the present invention include, but are not limited to, oil-degradable materials, degradable polymers, dehydrated compounds, and mixtures thereof. Such degradable materials are capable of undergoing an irreversible degradation downhole. The term "irreversible" as used herein means that the degradable material, once degraded downhole, should not recrystallize or reconsolidate, e.g., the degradable material should degrade in situ but should not recrystallize or reconsolidate in situ.

In some embodiments the degradable particles include oil-degradable materials. Suitable oil-degradable materials include oil-degradable polymers. Oil-degradable polymers that may be used in accordance with the present invention may be either natural or synthetic polymers. Some particular examples include, but are not limited to, polyacrylics, polyamides, and polyolefins (such as polyethylene, polypropylene, polyisobutylene, and polystyrene). Other suitable oil-degradable polymers include those that have a melting point which is such that the polymer will dissolve at the temperature of the subterranean formation in which it is placed such as a wax material. Where such oil-degradable particles are used, in the event the closure of the fracture undesirably compacts the proppant slurry, the oil-degradable particles may be degraded by the produced fluids, thus restoring at least some of the lost permeability. The degradable proppant may also be degraded by materials purposely placed in the formation by injection, mixing the degradable particle with delayed reaction degradation agents, or other suitable means to induce degradation.

Suitable examples of degradable polymers that may be used in accordance with the present invention include, but are not limited to, homopolymers, random, block, graft, and star- and hyper-branched polymers. Specific examples of suitable polymers include polysaccharides such as dextran or cellulose; chitin; chitosan; proteins; aliphatic polyesters; poly(lactide); poly(glycolide); poly($\epsilon$-caprolactone); poly(hydroxybutyrate); poly(anhydrides); aliphatic polycarbonates; poly(ortho esters); poly(amino acids); poly(ethylene oxide); polyphosphazenes, and combinations thereof. Polyanhydrides are another type of particularly suitable degradable polymer useful in the present invention. Examples of suitable polyanhydrides include poly(adipic anhydride), poly(suberic anhydride), poly(sebacic anhydride), and poly(dodecanedioic anhydride). Other suitable examples include but are not limited to poly(maleic anhydride) and poly(benzoic anhydride). One skilled in the art will recognize that plasticizers may be included in forming suitable polymeric degradable materials of the present invention. The plasticizers may be present in an amount sufficient to provide the desired characteristics, for example, more effective compatibilization of the melt blend components, improved processing characteristics during the blending and processing steps, and control and regulation of the sensitivity and degradation of the polymer by moisture.

Suitable dehydrated compounds are those materials that will degrade over time when rehydrated. For example, a particulate solid dehydrated salt or a particulate solid anhydrous borate material that degrades over time may be suitable. Specific examples of particulate solid anhydrous borate materials that may be used include but are not limited to anhydrous sodium tetraborate (also known as anhydrous borax), and anhydrous boric acid. These anhydrous borate materials are only slightly soluble in water. However, with time and heat in a subterranean environment, the anhydrous borate materials react with the surrounding aqueous fluid and are hydrated. The resulting hydrated borate materials are substantially soluble in water as compared to anhydrous borate materials and as a result degrade in the aqueous fluid.

Blends of certain degradable materials and other compounds may also be suitable. One example of a suitable blend of materials is a mixture of poly(lactic acid) and sodium borate where the mixing of an acid and base could result in a neutral solution where this is desirable. Another example would include a blend of poly(lactic acid) and boric oxide. Another example of a suitable blend is a composite of poly(lactic acid) and calcium carbonate, both will go into solution once the poly(lactic acid) begins to degrade. In choosing the appropriate degradable material or materials, one should consider the degradation products that will result. The degradation products should not adversely affect subterranean operations or components. The choice of degradable material also can depend, at least in part, on the conditions of the well, e.g., well bore temperature. For instance, lactides have been found to be suitable for lower temperature wells, including those within the range of 60° F. to 150° F., and polylactide have been found to be suitable for well bore temperatures above this range. Poly(lactic acid) and dehydrated salts may be suitable for higher temperature wells. Also, in some embodiments a preferable result is achieved if the degradable material degrades slowly over time as opposed to instantaneously. In some embodiments, it may be desirable when the degradable material does not substantially degrade until after the degradable material has been substantially placed in a desired location within a subterranean formation.

The specific features of the degradable particle may be chosen or modified to provide the propped fracture with optimum conductivity while maintaining its desirable filtering capability. Preferably, the degradable particle is selected to have a size and shape similar to the size and shape of the filler material to help maintain substantial uniformity within the mixture. It is preferable if the filler material and the degradable particle do not segregate within the proppant slurry. Whichever degradable particle is utilized, the degradable particles may have any shape, depending on the desired characteristics of the resultant voids in the proppant slurry, including, but not limited, to particles having the physical shape of platelets, shavings, flakes, ribbons, rods, strips, spheroids, toroids, pellets, tablets, or any other physical shape. The physical shape of the degradable particle should be chosen so as to enhance the desired shape and relative composition of the resultant voids within the proppant matrix. For example, a rod-like particle shape may be suitable in applications wherein channel-like voids in the proppant matrix are desired. One of ordinary skill in the art, with the benefit of this disclosure, will recognize the specific degradable particle and the preferred size and shape for a given application.

In some embodiments of the present invention, from 10% to about 90% of the combined weight of the degradable particles and filler material included in the proppant slurry is degradable particles. In other embodiments, from about 20% to about 70% of the combined weight of the degradable particles and filler material included in the proppant slurry is degradable particles. In still other embodiments, from about 25% to about 50% of the combined weight of the degradable particles and filler material included in the proppant slurry is degradable particles. The relative amounts of the degradable particles should not be such that, when degraded, an undesirable percentage of voids result in the proppant slurry, making the proppant slurry potentially ineffective in maintaining the integrity of the fracture. One of ordinary skill in the art, with the benefit of this disclosure, will recognize an optimum concentration of degradable particles that provides desirable values in terms of enhanced conductivity or permeability without undermining the stability of the proppant slurry itself.

As discussed above, the plurality of proppant aggregates generally are placed into the fracture(s) in conjunction with or proximate to a carrier fluid. In some embodiments, the carrier fluid is the same as the fracturing fluid. In some embodiments, the plurality of proppant aggregates may be suspended in the carrier fluid so that the carrier fluid deposits at least a portion of the proppant aggregates within the fracture(s). Generally the carrier fluid should have a viscosity sufficient to transport the proppant aggregates. As those of ordinary skill art will recognize, the viscosity of the carrier fluid should be adjusted, based, on among other things, on the composition of the particular proppant aggregates.

Any suitable carrier fluid that may be employed in subterranean operations may be used in accordance with the teachings of the present invention, including aqueous gels, viscoelastic surfactant gels, oil gels, foamed gels, and emulsions. In some embodiments, the carrier fluid may be the same as the fracturing fluid. Suitable aqueous gels are generally comprised of water and one or more gelling agents. Suitable emulsions can be comprised of two immiscible liquids such as an aqueous liquid or gelled liquid and a hydrocarbon. Foams can be created by the addition of a gas, such as carbon dioxide or nitrogen. In exemplary embodiments of the present invention, the carrier fluids are aqueous gels comprised of water, a gelling agent for gelling the water and increasing its viscosity, and, optionally, a crosslinking agent for crosslinking the gel and further increasing the viscosity of the fluid. The increased viscosity of the gelled, or gelled and cross-linked, carrier fluid, inter alia, reduces fluid loss and allows the carrier fluid to transport proppant particulates (where desired) and/or the proppant aggregates (if necessary). The water used to form the carrier fluid may be fresh water, saltwater, seawater, brine, or any other aqueous liquid that does not adversely react with the other components. The density of the water can be increased to provide additional particle transport and suspension in the present invention.

A variety of gelling agents may be used, including hydratable polymers that contain one or more functional groups, such as hydroxyl, carboxyl, sulfate, sulfonate, amino, or amide groups. Suitable gelling agents typically comprise biopolymers, synthetic polymers, or a combination thereof. A variety of gelling agents can be used in conjunction with the methods and compositions of the present invention, including, but not limited to, hydratable polymers that contain one or more functional groups, such as hydroxyl, cis-hydroxyl, carboxylic acids, derivatives of carboxylic acids, sulfate, sulfonate, phosphate, phosphonate, amino, or amide. In certain exemplary embodiments, the gelling agents may be biopolymers comprising polysaccharides, and derivatives thereof that contain one or more of these monosaccharide units: galactose, mannose, glucoside, glucose, xylose, arabinose, fructose, glucuronic acid, or pyranosyl sulfate. Examples of suitable polymers include, but are not limited to, xanthan gum, guar gum and derivatives thereof (such as hydroxypropyl guar and carboxymethylhydroxypropyl guar), and cellulose derivatives, (such as hydroxyethyl cellulose). Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other exemplary embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091. Suitable gelling agents generally are present in the viscosified treatment fluids of the present invention in an amount in the range of from about 0.1% to about 5% by weight of the water therein. In certain exemplary embodiments, the gelling agents are present in the viscosified treatment fluids of the present invention in an amount in the range of from about 0.01% to about 2% by weight of the water therein.

Crosslinking agents may be used to crosslink gelling agent molecules to form crosslinked gelling agents. Crosslinking agents typically comprise at least one metal ion that is capable of crosslinking polymer molecules. Examples of suitable crosslinking agents include, but are not limited to, borate compounds (such as, for example, alkaline earth metal borates, alkali metal-alkaline earth borates, and mixtures thereof); zirconium compounds (such as, for example, zirconium lactate, zirconium lactate triethanolamine, zirconium carbonate, zirconium acetylacetonate, zirconium malate, zirconium citrate, and zirconium diisopropylamine lactate); titanium compounds (such as, for example, titanium lactate, titanium malate, titanium citrate, titanium ammonium lactate, titanium triethanolamine, and titanium acetylacetonate); aluminum compounds (such as, for example, aluminum lactate or aluminum citrate); antimony compounds; chromium compounds; iron compounds; copper compounds; zinc compounds; or a combination thereof. Examples of suitable borate-based crosslinking agents are described in U.S. Pat. No. 6,024,170. Examples of suitable borate compounds include probertite, ulexite, nobleite, frolovite, colemanite, calcined colemanite, priceite, pateronite, hydroboracite, kaliborite, and other similar borates. Of the various slightly water-soluble borate compounds that may be used, colemanite, calcine colemanite, and ulexite are preferred, with colemanite being the most preferred. An example of a suitable commercially available borate-based crosslinking agent is the "BC-140™" crosslinking agent available from Halliburton Energy Services, Inc., Duncan, Okla. An example of a suitable commercially available zirconium-based crosslinking agent is the "CL-24™" crosslinking agent available from Halliburton Energy Services, Inc., Duncan, Okla. An example of a suitable commercially available titanium-based crosslinking agent is the "CL-39™" crosslinking agent available from Halliburton Energy Services, Inc., Duncan, Okla.

Suitable crosslinking agents generally are present in the aqueous gels of the present invention in an amount sufficient to provide, inter alia, the desired degree of crosslinking between gelling agent molecules. In certain exemplary embodiments of the present invention, the crosslinking agents may be present in an amount in the range from about 0.001% to about 10% by weight of the water in the carrier fluid. In certain exemplary embodiments of the present invention, the crosslinking agents may be present in the viscosified treatment fluids of the present invention in an amount in the range from about 0.01% to about 1% by weight of the water therein. Individuals skilled in the art, with the benefit of this disclosure, will recognize the exact type and amount of crosslinking agent to use, depending on factors such as the specific gelling agent, desired viscosity, and formation conditions.

The gelled, or gelled and crosslinked, carrier fluids may also comprise a gel breaker. Any suitable gel breaker may be used, including encapsulated gel breakers and internal delayed gel breakers, such as enzyme, oxidizing, acid buffer, or temperature-activated gel breakers. The gel breakers cause the viscous carrier fluids to revert to thin fluids that can be produced back to the surface after they have been used to place proppant particles in subterranean fractures. The gel breaker used is typically present in the carrier fluid in an amount in the range of from about 0.5% to about 10% by weight of the gelling agent. The carrier fluids may also include one or more of a variety of well-known additives, such as gel stabilizers, fluid loss control additives, clay stabilizers, bactericides, and the like.

Optionally, proppant particulates may be included in the gelled or gelled and crosslinked carrier fluids. Proppant particulates used in accordance with the present invention are generally of a size such that formation particulates that may migrate with produced fluids are prevented from being produced from the subterranean zone. Any suitable proppant particulates may be used, including sand (such as beach sand, desert sand, or graded sand), bauxite; ceramic materials; glass materials; polymer materials; Teflon® materials; nut shell pieces; seed shell pieces; cured resinous particulates comprising nut shell pieces; cured resinous particulates comprising seed shell pieces; fruit pit pieces; cured resinous particulates comprising fruit pit pieces; wood; composite particulates and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. Generally, the proppant particulates have a size in the range of from about 4 mesh to about 400 mesh, U.S. Sieve Series. In some embodiments of the present invention, the proppant particulates are graded sand having a particle size in the range of from about 10 mesh to about 120 mesh, U.S. Sieve Series.

In one embodiment, the present invention provides a method of fracturing a subterranean formation penetrated by a well bore, the method comprising: introducing a fracturing fluid into the well bore at or above a pressure sufficient to create or enhance at least one fracture in the subterranean formation; forming a plurality of proppant aggregates, each proppant aggregate comprising a binding fluid and a filler material; and introducing the plurality of proppant aggregates into the at least one fracture.

In another embodiment, the present invention provides a method of fracturing a subterranean formation penetrated by a well bore, the method comprising: introducing a fracturing fluid into the well bore at or above a pressure sufficient to create or enhance at least one fracture in the subterranean formation; forming a plurality of proppant aggregates, each proppant aggregate comprising a curable resin composition and a filler material, the curable resin composition comprising a resin and a curing agent; and introducing the plurality of proppant aggregates into the at least one fracture.

In another embodiment, the present invention provides a method of fracturing a subterranean formation penetrated by a well bore, the method comprising: introducing a fracturing fluid into the well bore at or above a pressure sufficient to create or enhance at least one fracture in the subterranean formation; forming a plurality of proppant aggregates, each proppant aggregate comprising an aqueous gel and a filler material; and introducing the plurality of proppant aggregates into the at least one fracture.

In another embodiment, the present invention provides a method of propping at least one fracture in a subterranean formation, the method comprising: forming a plurality of proppant aggregates, each proppant aggregate comprising a binding fluid and a filler material; and introducing the plurality of proppant aggregates into the at least one fracture.

In yet another embodiment, the present invention provides a method of propping at least one fracture in a subterranean formation, the method comprising: forming a plurality of proppant aggregates, each proppant aggregate comprising a binding fluid and a filler material, wherein the filler material is present in each proppant aggregate in an amount in the range of from about 1 pound to about 35 pounds per gallon of the binding fluid present in each proppant aggregate; suspending the plurality of proppant aggregates in a carrier fluid; introducing the carrier fluid into the at least one fracture, the carrier fluid containing the plurality of proppant aggregates suspended therein; depositing at least a portion of the proppant aggregates within the at least one fracture; and recovering at least a portion of the carrier fluid from the at least one fracture, wherein a substantial portion of the plurality of proppant aggregates remain in the at least one fracture.

To facilitate a better understanding of the present invention, the following examples of the specific embodiments are given. In no way should the following examples be read to limit, or define, the scope of the invention.

EXAMPLES

Example 1

An acrylic slot model with dimensions of 8 feet in length, 5 inches in height, and ¼ inch of gap width was used in this example to simulate a fracture. The acrylic slot model had two inlet ports at one end of the model to simulate perforations. For this example, the effect of closure stress was neglected.

A DELTA FRAC® 140 gel fluid having a gelling agent concentration of 40 pounds per thousand gallons (lbs/Mgal) was prepared and dyed fluorescent. A DELTA FRAC® 140 gel fluid having a gelling agent concentration of 60 lbs/Mgal also was prepared and dyed purple. Both DELTA FRAC® 140 gel fluids were crosslinked. DELTA FRAC® 140 gel fluid is an aqueous gel that is commercially available from Halliburton Energy Services, Duncan, Okla.

Once prepared, each fluid was pumped simultaneously using separate peristaltic MASTERFLEX® L/S pumps at a pump rate of 1,200 milliliters per minute (ml/min) into a ½-inch inner diameter hose and then into one of the inlet ports of the acrylic slot model. As the fluids were streamlined into the slot model, the hoses connecting the pumps to the inlet ports were switched to determine the effectiveness of streamlining of the two fluids. It was observed that the two fluids streamlined into the acrylic slot model in aggregates with a stringy shape, which were distributed throughout the slot model.

Example 2

An acrylic slot model with dimensions of 8 feet in length, 5 inches in height, and ¼ inch of gap width was used in this example to simulate a fracture. The acrylic slot model had two inlet ports at one end of the model to simulate perforations. For this example, the effect of closure stress was neglected.

One liter of a crosslinked VERSAGEL™ fluid having a gelling agent concentration of 80 lbs/Mgal, that did not contain any gel breaker was prepared and dyed purple. VERSAGEL™ fluid is an aqueous gel that is commercially available from Halliburton Energy Services, Duncan, Okla. In a separate container, two liters of a DELTA FRAC® 140 gel fluid having a gelling agent concentration of 60 lbs/Mgal, that was not crosslinked, was prepared. Subsequent to preparation the two fluids were mixed together, wherein shear was applied to the crosslinked VERSAGEL™ fluid during combination with the DELTA FRAC® 140 gel fluid to shred the crosslinked VERSAGEL™ fluid into aggregates of about ½-inch by 1½-inch. Next, the mixture was pumped into the slot model using a peristaltic MASTERFLEX® L/S pump at a pump rate of 2,000 ml/min, until the slot model was filled with the mixture. It was observed that the aggregates of the crosslinked VERSAGEL™ fluid were suspended in the DELTA FRAC® 140 gel fluid and were distributed evenly throughout the length and height of the slot model.

Once the slot model was filled, tap water was injected into the slot model at 200 ml/min using the peristaltic MASTERFLEX® L/S pump to purposely remove part of the DELTA FRAC® 140 gel fluid and create channels in the slot model. The tap water simulates a produced fluid that removes a carrier fluid to create channels in a fracture, wherein proppant aggregates remain in the fracture. It was observed that the tap water removed part of the DELTA FRAC® 140 gel fluid without removing the aggregates of the crosslinked VERSAGEL™ fluid that were distributed throughout the slot model.

Example 3

An acrylic slot model with dimensions of 4 feet in length, 5 inches in height, and ⅜ inch of gap width was used in this example to simulate a fracture. The acrylic slot model had two inlet ports at one end of the model to simulate perforations. For this example, the effect of closure stress was neglected.

A sand-laden gel was prepared by mixing 20/40-mesh Brady sand with PERMSEAL™ sealant in an amount of 15 pounds of sand per gallon of the sealant. PERMSEAL™ sealant is a crosslinkable aqueous gel that is commercially available from Halliburton Energy Services, Duncan, Okla. Once crosslinked into a stable sand-land gel, aggregates of the sand-laden gel were obtained by shearing the crosslinked sand-land gel into small aggregates of ¼ inch×⅜ inch or smaller in size. The aggregates of the crosslinked sand-land gel were then suspended in viscous gel containing water and hydroxyethylcellulose in an amount of 60 pounds of hydroxyethylcellulose per 1000 gallons of water. The mixture was then pumped into the slot model. It was observed that the aggregates of the crosslinked sand-land gel were neutrally suspended and distributed evenly throughout the length and height of the slot model.

Example 4

An acrylic slot model with dimensions of 4 feet in length, 5 inches in height, and ⅜ inch of gap width was used in this example to simulate a fracture. The acrylic slot model had two inlet ports at one end of the model to simulate perforations. For this example, the effect of closure stress was neglected.

A glass-laden gel was prepared by mixing microsphere glass (with average particle size of 10 microns and specific gravity of 0.95) with PERMSEAL™ sealant in an amount of 15 pounds of sand per gallon of the sealant. Once crosslinked into a stable glass-laden gel, aggregates of the crosslinked glass-laden gel were obtained by shearing the crosslinked glass-laden gel into small aggregates of ¼ inch×⅜ inch or smaller in size. The aggregates of the crosslinked glass-laden gel were then suspended in tap water. The mixture was then pumped into the slot model. It was observed that the aggregates of the crosslinked glass-laden gel were neutrally suspended and distributed evenly throughout the length and height of the slot model.

Therefore, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of fracturing a subterranean formation penetrated by a well bore, comprising:
   introducing a fracturing fluid into the well bore at or above a pressure sufficient to create or enhance at least one fracture in the subterranean formation;
   forming a plurality of proppant aggregates, each proppant aggregate comprising a binding fluid and a filler material; and
   introducing the plurality of proppant aggregates into the at least one fracture, wherein the plurality of proppant aggregates are introduced into the at least one fracture so that each fracture is a high porosity propped fracture having a porosity of at least about 40%.

2. The method of claim 1 wherein the high porosity propped fracture has a porosity of at least about 60%.

3. The method of claim 1 wherein the high porosity propped fracture has a porosity of at least about 90%.

4. The method of claim 1 wherein the proppant aggregates are in the shape of ovals, spheroids, stringy masses, or a combination thereof.

5. The method of claim 1 wherein each proppant aggregate is substantially the same size.

6. The method of claim 1 wherein forming the plurality of proppant aggregates comprises providing a slurry, the slurry comprising the binding fluid and the filler material.

7. The method of claim 6 wherein forming the plurality of proppant aggregates comprises pumping intermittently the slurry into the well bore.

8. The method of claim 6 wherein forming the plurality of proppant aggregates comprises:
   providing a carrier fluid in a container;
   pumping the proppant slurry comprising the binding fluid and the filler material into the container; and
   shearing the proppant slurry as it is pumped into the container that contains the carrier fluid, so as to form the plurality of proppant aggregates.

9. The method of claim 6 wherein forming the plurality of proppant aggregates comprises:
   providing a carrier fluid;
   introducing the carrier fluid into the well bore; and
   injecting a plurality of predetermined volumes of the slurry into the carrier fluid as the carrier fluid is introduced into the well bore, so as to form the plurality of proppant aggregates.

10. The method of claim 9 wherein each predetermined volume is in the range of from about 0.01 gallon to about 5 gallons.

11. The method of claim 6 wherein forming the plurality of proppant aggregates comprises:
   providing a carrier fluid;
   introducing the carrier fluid into the at least one fracture; and
   introducing the slurry into the at least one fracture, wherein the carrier fluid and the proppant slurry are simultaneously introduced into the at least one fracture via separate flow paths.

12. The method of claim 1 wherein the binding fluid comprises a curable resin composition comprising a resin.

13. The method of claim 12 wherein the resin is selected from the group consisting of: a two-component epoxy-based resin, a novolak resin, a polyepoxide resin, a phenol-aldehyde resin, a urea-aldehyde resin, a urethane resin, a phenolic resin, a furan resin, a furan/furfuryl alcohol resin, a phenolic/latex resin, a phenol formaldehyde resin, a polyester resin, a hybrid polyester resin, a copolymer polyester resin, a polyurethane resin, a hybrid polyurethane resin, a copolymer polyurethane resin, an acrylate resin, and mixtures thereof.

14. The method of claim 12 wherein the curable resin composition comprises a solvent.

15. The method of claim 1 wherein the binding fluid comprises an aqueous gel that comprises water and a gelling agent.

16. The method of claim 15 wherein the gelling agent is crosslinked using a crosslinking agent.

17. The method of claim 15 wherein the water is fresh water, saltwater, seawater, brine, or a combination thereof.

18. The method of claim 15 wherein the gelling agent is a biopolymer, a synthetic polymer, or a combination thereof.

19. The method of claim 15 wherein the gelling agent is a polysaccharide or a derivative thereof.

20. The method of claim 1 wherein the filler material is selected from the group consisting of: a sand, a bauxite, a ceramic material, a glass material, a polymer material, a nut shell piece, a seed shell piece, a cured resinous particulate comprising nut shell pieces, a cured resinous particulate comprising seed shell pieces, a fruit pit piece, a cured resinous particulate comprising fruit pit pieces, wood, a composite particulate, a lightweight particulate, a microsphere plastic bead, a ceramic microsphere, a glass microsphere, a man-made fiber, a cement, fly ash, carbon black powder, and a combination thereof.

21. The method of claim 1 wherein the filler material has an average particle size in the range of from about 2 mesh to about 300 mesh.

22. The method of claim 1 wherein the filler material is present in each proppant aggregate in an amount in the range of from about 1 pound to about 35 pounds per gallon of the binding fluid present in each proppant aggregate.

23. The method of claim 1 wherein the filler material is present in each proppant aggregate in an amount in the range of from about 0.1 pound to about 10 pounds per gallon of the binding fluid present in each proppant aggregate.

24. The method of claim 1 wherein the filler material is coated with an adhesive substance.

25. The method of claim 24 wherein the adhesive substance is selected from the group consisting of a non-aqueous tackifying agent, an aqueous tackifying agent, a silyl-modified polyamide, a curable resin composition, and a combination thereof.

26. The method of claim 25 wherein the non-aqueous tackifying agent is selected from the group consisting of a polyamide, a polyester, a polycarbonate, a polycarbamate, a natural resin, and a combination thereof.

27. The method of claim 26 wherein the non-aqueous tackifying agent comprises a multifunctional material.

28. The method of claim 25 wherein the aqueous tackifying agent is selected from the group consisting of: an acrylic acid polymer, acrylic acid ester polymer, acrylic acid derivative polymer, acrylic acid homopolymer, acrylic acid ester homopolymer, acrylamido-methyl-propane sulfonate polymer, acrylamido-methyl-propane sulfonate derivative polymer, acrylamido-methyl-propane sulfonate copolymer, acrylic acid/acrylamido-methyl-propane sulfonate copolymer, a copolymer thereof, and a combination thereof.

29. The method of claim 28 wherein the aqueous tackifying agent is made tacky through exposure to an activator and wherein the activator is selected from the group consisting of: an organic acid, an anhydride of an organic acid, an inorganic acid, an inorganic salt, a charged surfactant, a charged polymer, and a combination thereof.

30. The method of claim 25 wherein the curable resin composition is selected from the group consisting of: a two-component epoxy-based resin, a novolak resin, a polyepoxide resin, a phenol-aldehyde resin, a urea-aldehyde resin, a urethane resin, a phenolic resin, a furan resin, a furan/furfuryl alcohol resin, a phenolic/latex resin, a phenol formaldehyde resin, a polyester resin, a hybrid polyester resin, a copolymer polyester resin, a polyurethane resin, a hybrid polyurethane resin, a copolymer polyurethane resin, an acrylate resin, and mixture thereof.

31. The method of claim 1 wherein each proppant aggregate comprises degradable particles.

32. The method of claim 31 wherein the degradable particles are selected from the group consisting of: oil-degradable materials, degradable polymers, dehydrated compounds, and mixture thereof.

33. The method of claim 31 wherein the degradable particles are selected from the group consisting of: a polysaccharide, a chitin, a chitosan, a protein, an aliphatic polyester, a poly(lactide), a poly(glycolide), a poly($\epsilon$-caprolactone), a poly(hydroxybutyrate), a poly(anhydride), an aliphatic polycarbonate, a poly(orthoester), a poly(amino acid), a poly(ethylene oxide), a polyphosphazene, a polyanhydride, and combinations thereof.

34. The method of claim 32 wherein from about 10% to about 90% of the combined weight of the degradable particles and the filler material included in each proppant aggregate is degradable particles.

35. The method of claim 1 further comprising:
providing a carrier fluid; and
suspending the plurality of proppant aggregates in the carrier fluid.

36. The method of claim 35 wherein the fracturing fluid and the carrier fluid are the same fluid.

37. The method of claim 35 wherein the carrier fluid is selected from the group consisting of: an aqueous gel, an oil gel, a foamed gel, an emulsion, a viscoelastic surfactant gel, and a combination thereof.

38. The method of claim 35 wherein the carrier fluid comprises proppant particulates.

39. The method of claim 35 wherein the carrier fluid is an aqueous gel that comprises water, a gelling agent, and a gel breaker.

40. The method of claim 35 wherein introducing the plurality of proppant aggregates into the at least one fracture comprises introducing the carrier fluid into the at least one fracture.

41. The method of claim 40 further comprising recovering at least a portion of the carrier fluid from the at least one fracture, wherein at least a substantial portion of the plurality of proppant aggregates are not recovered from the at least one fracture.

42. The method of claim 40 wherein the ratio of the masses of the proppant aggregates to the carrier fluid introduced into the at least one fracture is in the range of from about 1:9 by volume to about 8:2 by volume.

43. The method of claim 40 wherein the ratio of the masses of the proppant aggregates to the carrier fluid introduced into the at least one fracture is in the range of from about 4:6 by volume to about 6:4 by volume.

44. The method of claim 1 further comprising shutting in the well bore for a period of time after the step of introducing the plurality of proppant aggregates into the at least one fracture.

45. The method of claim 44 wherein the period of time is up to about 72 hours.

46. A method of fracturing a subterranean formation penetrated by a well bore, comprising:
introducing a fracturing fluid into the well bore at or above a pressure sufficient to create or enhance at least one fracture in the subterranean formation;
forming a plurality of proppant aggregates, each proppant aggregate comprising a curable resin composition and a filler material, the curable resin composition comprising a resin; and p1 introducing the plurality of proppant aggregates into the at least one fracture, wherein the plurality of proppant aggregates are introduced into the at least one fracture so that each fracture is a high porosity propped fracture having a porosity of at least about 40%.

47. The method of claim 46 further comprising allowing at least a portion of the proppant aggregates to cure into at least one hardened mass within the at least one fracture.

48. The method of claim 46 further comprising:
providing a carrier fluid; and
suspending the plurality of proppant aggregates in the carrier fluid.

49. The method of claim 48 further comprising:
introducing the carrier fluid into the at least one fracture, the carrier fluid comprising the plurality of proppant aggregates suspended therein; and
depositing at least a portion of the proppant aggregates within the at least one fracture.

50. The method of claim 48 wherein the carrier fluid and the fracturing fluid are the same fluids.

51. A method of fracturing a subterranean formation penetrated by a well bore, comprising:
introducing a fracturing fluid into the well bore at or above a pressure sufficient to create or enhance at least one fracture in the subterranean formation;
forming a plurality of proppant aggregates, each proppant aggregate comprising an aqueous gel and a filler material; and
introducing the plurality of proppant aggregates into the at least one fracture.

52. The method of claim 51 further comprising:
providing a carrier fluid; and
suspending the plurality of proppant aggregates in the carrier fluid.

53. The method of claim 52 further comprising:
introducing the carrier fluid into the at least one fracture, the carrier fluid containing the plurality of proppant aggregates suspended therein; and
depositing at least a portion of the proppant aggregates within the at least one fracture.

54. The method of claim 52 wherein the carrier fluid and the fracturing fluid are the same fluids.

55. A method of propping at least one fracture in a subterranean formation, comprising:
forming a plurality of proppant aggregates, each proppant aggregate comprising a binding fluid and a filler material; and
introducing the plurality of proppant aggregates into the at least one fracture, wherein the plurality of proppant aggregates are introduced into the at least one fracture so that each fracture is a high porosity propped fracture having a porosity of at least about 40%.

56. The method of claim 55 wherein the binding fluid comprises a curable resin composition, the curable resin composition comprising a resin.

57. The method of claim 56 wherein the binding fluid comprises an aqueous gel, the aqueous gel comprising water and a gelling agent.

58. The method of claim 57 wherein the gelling agent is crosslinked using a crosslinking agent.

59. The method of claim 55 wherein the filler material is selected from the group consisting of: a sand, a bauxite, a ceramic material, a glass material, a polymer material, a nut shell piece, a seed shell piece, a cured resinous particulate comprising nut shell pieces, a cured resinous particulate comprising seed shell pieces, a fruit pit piece, a cured resinous particulate comprising fruit pit pieces, wood, a composite particulate, a lightweight particulate, a microsphere plastic bead, a ceramic microsphere, a glass microsphere, a man-made fiber, a cement, fly ash, carbon black powder, and combinations thereof.

60. The method of claim 55 wherein each proppant aggregate comprises degradable particles.

61. The method of claim 55 further comprising:
providing a carrier fluid;
suspending the plurality of proppant aggregates in the carrier fluid.

62. The method of claim 61 wherein introducing the plurality of proppant aggregates into the at least one fracture comprises introducing the carrier fluid into the at least one fracture.

63. The method of claim 55 further comprising shutting in the well bore for a period of time after the step of introducing the plurality of proppant aggregates into the at least one fracture.

64. A method of propping at least one fracture in a subterranean formation, comprising:
forming a plurality of proppant aggregates, each proppant aggregate comprising a binding fluid and a filler material, wherein the filler material is present in each proppant aggregate in an amount in the range of from about 1 pound to about 35 pounds per gallon of the binding fluid present in each proppant aggregate;
suspending the plurality of proppant aggregates in a carrier fluid;
introducing the carrier fluid into the at least one fracture, the carrier fluid containing the plurality of proppant aggregates suspended therein;
depositing at least a portion of the proppant aggregates within the at least one fracture; and
recovering at least a portion of the carrier fluid from the at least one fracture.

65. The method of claim 64 wherein the binding fluid comprises an aqueous gel or a curable resin composition.

* * * * *